(12) United States Patent
Miyata et al.

(10) Patent No.: US 9,678,256 B2
(45) Date of Patent: Jun. 13, 2017

(54) TRANSPARENT HEAT-SHIELDING MEMBER

(71) Applicant: HITACHI MAXELL, LTD., Osaka (JP)

(72) Inventors: Teruhisa Miyata, Osaka (JP); Yoshimasa Mitsumoto, Osaka (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 0 days.

(21) Appl. No.: 15/081,329

(22) Filed: Mar. 25, 2016

(65) Prior Publication Data
US 2016/0282529 A1     Sep. 29, 2016

(30) Foreign Application Priority Data

Mar. 27, 2015  (JP) ................. 2015-066852
Apr. 23, 2015  (JP) ................. 2015-088649

(51) Int. Cl.
*G02B 5/08*     (2006.01)
*G02B 5/20*     (2006.01)
*F21V 9/04*     (2006.01)
*F21V 9/06*     (2006.01)
*G02B 5/02*     (2006.01)
*G03B 21/62*    (2014.01)
(Continued)

(52) U.S. Cl.
CPC ........... *G02B 5/208* (2013.01); *G02B 5/0242* (2013.01); *G02B 5/26* (2013.01); *G03B 21/62* (2013.01); *G02B 1/14* (2015.01)

(58) Field of Classification Search
CPC ...... G02B 5/208; G02B 5/0891; G02B 5/282; G02B 5/0808; C03C 17/366
See application file for complete search history.

(56) References Cited

U.S. PATENT DOCUMENTS

| 6,404,543 B1 | 6/2002 | Shoshi et al. |
| 2001/0005282 A1 | 6/2001 | Etori et al. |
| 2006/0181769 A1 | 8/2006 | Kumasawa et al. |

(Continued)

FOREIGN PATENT DOCUMENTS

| JP | 3993980 B2 | 10/2007 |
| JP | 4190657 B2 | 12/2008 |

(Continued)

*Primary Examiner* — Bumsuk Won
*Assistant Examiner* — Tamara Y Washington
(74) *Attorney, Agent, or Firm* — Birch, Stewart, Kolasch & Birch, LLP

(57) ABSTRACT

A transparent heat-shielding member according to the present invention includes a transparent base substrate, an infrared reflective layer and a transparent screen function layer. The infrared reflective layer includes at least one selected from a metal oxide layer and a metal nitride layer, and a metal layer. The transparent screen function layer is formed of a light diffusing layer. The light diffusing layer contains light diffusing particles and a transparent resin. The light diffusing particles are dispersed in the transparent resin. The transparent heat-shielding member has a visible light reflectance measured in accordance with JIS R3106-1998 of 12% or more and 30% or less, a haze value measured in accordance with JIS K7136-2000 of 5% or more and 35% or less, and a shading coefficient measured in accordance with JIS A5759-2008 of 0.69 or less.

9 Claims, 4 Drawing Sheets

(51) Int. Cl.
*G02B 5/26* (2006.01)
*G02B 1/14* (2015.01)

(56) References Cited

U.S. PATENT DOCUMENTS

2013/0279000 A1 10/2013 Maeda et al.
2015/0153639 A1 6/2015 Tokunaga

FOREIGN PATENT DOCUMENTS

| JP | 2011-113068 A | 6/2011 | |
|----|----|----|----|
| JP | 4822104 B2 | 11/2011 | |
| JP | 2013-10341 A | 1/2013 | |
| JP | 2013-151103 A | 8/2013 | |
| JP | 2013-210454 A | 10/2013 | |
| JP | WO 2013151136 A1 * | 10/2013 | ............... B32B 7/02 |
| WO | WO 2012/096304 A1 | 7/2012 | |

* cited by examiner

TRANSPARENT HEAT-SHIELDING MEMBER

BACKGROUND OF THE INVENTION

1. Field of the Invention

The present invention relates to a transparent heat-shielding member having a transparent screen function that enables an image projected onto a screen by a projector to be seen as a reflected image from the projector side and as a transmitted image from the opposite side of the projector across the screen, or in other words, enables the image to be clearly viewed from both sides by viewers, as well as the background to be transparently viewed.

2. Description of Related Art

From the viewpoint of preventing global warming and saving energy, in order to block heat rays (infrared rays) from sunlight entering through the windows of buildings, display windows of shops, the windows of vehicles and the like, a transparent heat ray blocking member is commonly provided on or within a window pane or an organic transparent substrate, thereby to reduce the temperature inside the room or vehicle (for example, Patent Document 1 listed below). In addition, recently, from the viewpoint of saving energy throughout the year, transparent heat-shielding/heat-insulating members having not only heat shielding properties that block heat rays that cause a temperature increase in summer, but also heat-insulating properties that suppress the escape of heat from the inside of the room in winter by shielding far infrared rays emitted from the inside to the outside of the room through a light transmitting member (reflecting far infrared rays toward the inside of the room) so as to reduce the heating load have been proposed as solar control films and are increasingly introduced into the market (for example, Patent Documents 2 to 4 listed below).

In recent years, attention has been focused on so-called "digital signage" used as a medium for providing advertisements, guidance and information, instead of conventional signboards, posters and large screen displays, in particular, in glass-walled commercial establishments, and display windows of convenience stores, department stores, and shops such as clothes and automobile shops by attaching a transparent screen onto a window or a display window so as to allow the window itself to function as a large screen, and projecting and displaying various content images such as advertisements, merchandise information and other information by using a projector from the inside while the transparent viewability is maintained at a level at which the interior state and goods can be viewed from the outside, because the digital signage has a very high eye-catching effect for people who are outside, is easily adapted to changes in the content, and is convenient. Likewise, in automobiles, attention has been focused on a head-up display (HUD) apparatus that projects and displays navigation information from a small-sized projector by using a portion of the surface of the windshield, a transparent or semi-transparent beam splitter, called a combiner, provided near the rearview mirror or near the driver's sight lines, or the like, or that projects and displays navigation information as a virtual image through the windshield, so as to allow the driver to see the navigation information without significantly moving his/her viewing point (for example, Patent Documents 5 to 8 listed below).

Patent Document 1: Japanese Patent No. 4190657
Patent Document 2: JP 2013-010341 A
Patent Document 3: JP 2013-151103 A
Patent Document 4: WO 2012/096304
Patent Document 5: Japanese Patent No. 3993980
Patent Document 6: JP 2013-210454A
Patent Document 7: Japanese Patent No. 4822104
Patent Document 8: JP 2011-113068 A The heat-shielding members of Patent Documents 1 to 4 can, by being attached to a window, provide a heat-shielding function or a heat-shielding/heat-insulating function to the window itself, but they hardly function as a transparent screen for digital signage because they are not provided with a transparent screen function that displays content projected by a projector, and a design that gives consideration thereto is not disclosed.

To be specific, Patent Document 1 discloses an infrared shielding film obtained by coating a PET film with an infrared shielding layer made of an ionizing radiation curable resin in which a rare-earth metal-based infrared shielding agent is dispersed. The infrared shielding film shields near infrared rays through absorption, but it does not have a heat-insulating function that reflects far infrared rays. In addition, as far as it is understood from the reference examples and examples of the patent document, the infrared shielding film has a haze value as small as about 1%. Accordingly, at least an element for sufficiently scattering light is not included in the constituent members, and a design that gives consideration thereto is not disclosed, and thus the infrared shielding film hardly functions as a transparent screen for digital signage.

Patent Document 2 discloses a heat ray reflective film obtained by forming a heat ray reflective layer composed of a thin metal oxide film, a thin metal film and a thin metal oxide film onto a PET film by a sputtering method, and attaching a polyolefin resin film such as an OPP or COP coated with a hardcoat layer onto the heat ray reflective layer via an adhesive layer. However, the zeonor film used in an example has a haze value as small as 0.1%, and the haze value of the OPP films used in other examples is not clearly disclosed, but commercially available OPP films for use as a protective layer for a transparent heat ray reflective film have a haze value of 3% at the highest. Accordingly, at least an element for sufficiently scattering light is not included in the constituent members, and a design that gives consideration thereto is not disclosed, and thus the heat ray reflective film hardly functions as a transparent screen for digital signage.

Patent Document 3 discloses a transparent stacked film obtained by forming a transparent stacked portion in which a thin metal oxide film and a thin metal film are alternately stacked onto a PET film by a sol-gel method and a sputtering method, attaching an olefin resin film such as an OPP film onto the transparent stacked portion via an adhesive layer, and further coating the olefin resin film with a protective layer made of silicon oxide. However, the OPP films used in the examples have a haze value as small as 2%. Accordingly, at least an element for sufficiently scattering light is not included in the constituent members, and a design that gives consideration thereto is not disclosed, and thus the transparent stacked film hardly functions as a transparent screen for digital signage.

Patent Document 4 discloses a far infrared reflective stacked body obtained by forming, onto a PET film, a far infrared reflective layer composed of a single metal layer containing silver (Ag) in an amount of 95 to 100 mass % or a plurality of layers including a metal layer containing silver (Ag) in an amount of 95 to 100 mass %, a metal oxide layer and/or a metal nitride layer by a sputtering method, and coating the far infrared reflective layer with a hardcoat layer having one or more polar groups selected from the group consisting of a phosphoric acid group, a sulfonic acid group and an amide group. However, at least an element for sufficiently scattering light is not included in the constituent members, and a design that gives consideration thereto is not disclosed, and thus the far infrared reflective stacked body hardly functions as a transparent screen for digital signage.

On the other hand, the transparent screen members disclosed in Patent Documents 5 to 8 can provide, by being attached to a window, a transparent screen function that displays content projected by a projector on the window itself, but they are not provided with a near infrared ray shielding function or a far infrared ray reflecting function. In addition, a design that gives consideration thereto is not disclosed, and thus the transparent screen members hardly function as a transparent heat-shielding member or a transparent heat-shielding/heat-insulating member.

To be specific, Patent Document 5 discloses a transmissive screen obtained by coating a glass or PET film with a resin such as polyvinyl butyral resin, polystyrene resin, polyester resin, polyurethane adhesive or ultraviolet curable acrylate resin in which light diffusing particles such as acrylic resin particles, silicone resin particles or polystyrene resin particles are dispersed. However, none of the materials shields near infrared rays nor reflects far infrared rays. In addition, a design that gives consideration thereto is not disclosed, and thus the transmissive screen hardly functions as a transparent heat-shielding member or a transparent heat-shielding/heat-insulating member.

Patent Document 6 discloses a transmissive screen obtained by coating a PET film with a hydrophilic resin such as a completely or partially saponified polyvinyl alcohol or a cationically modified polyvinyl alcohol in which light diffusing particles made of, for example, amorphous synthetic silica, alumina or hydrated alumina are dispersed. However, none of the materials shields near infrared rays nor reflects far infrared rays. In addition, a design that gives consideration thereto is not disclosed, and thus the transmissive screen hardly functions as a transparent heat-shielding member or a transparent heat-shielding/heat-insulating member.

Patent Document 7 discloses a projection screen obtained by attaching, to both surfaces of a glass sheet, a PET film coated with a polarization-selective reflective layer made of a cholesteric liquid crystal resin having a selective reflection center wavelength in the visible light region and a PET film in which a transmissive volume hologram has been recorded and fixed by application of a hologram photosensitive material made of a photo polymer or the like and exposure to light, by using a pressure-sensitive adhesive. However, as long as the scope of the disclosure of Patent Document 7 is considered, none of the materials shields near infrared rays nor reflects far infrared rays. In addition, a design that gives consideration thereto is not disclosed, and thus the projection screen hardly functions as a transparent heat-shielding member or a transparent heat-shielding/heat-insulating member.

Patent Document 8 discloses a transmissive screen obtained by coating a glass sheet with a polyvinyl acetal resin in which nanodiamond particles having a very high refractive index are dispersed as light diffusing particles, or by forming them into a laminated glass. However, none of the materials shields near infrared rays nor reflects far infrared rays. In addition, a design that gives consideration thereto is not disclosed, and thus the transmissive screen hardly functions as a transparent heat-shielding member or a transparent heat-shielding/heat-insulating member.

As described above, despite the fact that a large number of windows in the surrounding living space are required to have a heat-shielding function or a heat-shielding/heat-insulating function as described above from the viewpoint of saving energy or to have a transparent screen function as described above from the viewpoint of digital signage, surprisingly, to the best of the inventors' knowledge, a member that has both functions has not been found, and an idea of providing such a member has not been conceived yet.

Furthermore, recently, it is taken for granted that a transparent screen for window display is required to have a high viewability that enables a content image projected by a projector to be viewed from a wide range of angles so as to maximize the function as digital signage. In addition thereto, opportunities are gradually increasing not only for a content image to be viewed from outside of the window to which the transparent screen has been attached (from the opposite side of the projector across the screen) as a transmitted image, but also for the content image projected onto the transparent screen to be viewed from inside of the window (from the projector side with respect to the screen) as a reflected image, and therefore there is an increasing need for a transmissive screen having excellent viewability from the inside and outside of the window, or in other words, excellent viewability from both sides of the screen. However, commercially available transmissive transparent screens have high forward light scattering properties and thus can provide a clear transmitted image as viewed from the opposite side of the projector across the screen, but the backward light scattering properties are not so high, and thus although it is possible to view the reflected image from the projector side, the image has a low brightness (luminance) and blurred. Accordingly, it cannot be said that the image clarity is sufficient.

SUMMARY OF THE INVENTION

It is an object of the present invention to provide a transparent heat-shielding member or a transparent heat-shielding/heat-insulating member that provides excellent heat shielding properties or heat-shielding/heat-insulating properties when used as a solar control transparent window film for saving energy, and that has a transparent screen function that provides excellent viewability from both sides of a screen onto which an image is projected when used as a transparent screen for digital signage, in particular, in terms of reflective viewability from the projector side, excellent brightness (luminance) and image clarity (less blur) and that allows the background to be transparently viewed with clarity.

As a result of in-depth research to solve the above-described problems, the present inventors found that by configuring a transparent heat-shielding member so as to have a configuration described below, the transparent heat-shielding member allows the background to be transparently viewed and provides excellent heat shielding properties when used as a window film for saving energy, and unexpectedly excellent viewability from both sides of a screen onto which an image is projected when used as a transparent screen for digital signage, in particular, in terms of reflective viewability from the projector side, unexpectedly excellent brightness (luminance) and image clarity (less blur). The present invention has thus been accomplished.

The present invention relates to a transparent heat-shielding member including a transparent base substrate, an infrared reflective layer and a transparent screen function layer, wherein the infrared reflective layer includes at least one selected from a metal oxide layer and a metal nitride layer, and a metal layer, the transparent screen function layer is formed of a light diffusing layer, the light diffusing layer contains light diffusing particles and a transparent resin, the light diffusing particles are dispersed in the transparent resin, and the transparent heat-shielding member has a visible light reflectance measured in accordance with Japanese Industrial Standard (JIS) R3106-1998 of 12% or more and 30% or less, a haze value measured in accordance with JIS K7136-2000 of 5% or more and 35% or less, and a shading coefficient measured in accordance with JIS A5759-2008 of 0.69 or less.

With the transparent heat-shielding member having the configuration described above, the infrared reflective layer having a metal layer and a metal oxide layer and/or a metal nitride layer can reflect infrared rays of sunlight ranging from near infrared rays to far infrared rays, and thus good heat-shielding characteristics can be obtained. Meanwhile, the infrared reflective layer can properly reflect visible light at a visible light reflectance of 12 to 30%, and allows most of the remaining light to pass therethrough. Accordingly, with a synergistic effect with the light diffusing layer in which light diffusing particles are dispersed in a transparent resin and that has a predetermined haze value, good visible light scattering/reflecting characteristics can be obtained. Also, when the transparent heat-shielding member according to the present invention is used by being attached to a transparent substrate such as, for example, a window pane by using a transparent pressure-sensitive adhesive or the like, the transparent heat-shielding member according to the present invention can be used as a transparent heat-shielding member that allows the background to be transparently viewed with clarity, or in other words, a solar control transparent film for saving energy, and at the same time, as a transparent screen for digital signage that allows a content image projected by a projector to be clearly viewed from both sides. Accordingly, the transparent heat-shielding member according to the present invention is very useful.

Also, the transparent heat-shielding member having a transparent screen function according to the present invention preferably has a visible light transmittance measured in accordance with JIS A5759-2008 of 65% or more. With this configuration, good transparent viewability can be obtained. When the transparent heat-shielding member according to the present invention is used by being attached to a transparent substrate such as, for example, a window pane by using a transparent pressure-sensitive adhesive, the internal and external backgrounds and conditions can be clearly viewed from any position both inside and outside without compromising the transparency of the transparent substrate.

Furthermore, in the transparent heat-shielding member having a transparent screen function according to the present invention, it is preferable to form, as a hardcoat layer, a protective layer containing at least an ionizing radiation curable resin or a thermosetting resin on the topmost surface layer (sir side) in the case where it is used by being attached to a transparent substrate. With this configuration, it is possible to, when the transparent heat-shielding member having a transparent screen function is attached to a transparent substrate or is cleaned, prevent the surface from being damaged.

Furthermore, in the transparent heat-shielding member having a transparent screen function according to the present invention, it is preferable that the protective layer is stacked on the infrared reflective layer via a primer layer made of a polyolefin resin modified with an acid, an acid anhydride or a hydroxyl group. With this configuration, even better adhesion can be obtained between the protective layer and the infrared reflective layer, and at the same time, it does not interfere with providing heat-insulating properties, which will be described later, and the adhesion can be secured.

Furthermore, it is also preferable to configure the transparent heat-shielding member having a transparent screen function according to the present invention so as to have a normal emissivity value measured in accordance with JIS R3106-2008 of 0.50 or less. With this configuration, far infrared rays can be more efficiently reflected, and thus when the transparent heat-shielding member according to the present invention is used by being attached to a transparent substrate such as, for example, a window pane by using a transparent pressure-sensitive adhesive or the like, heat-insulating properties that suppress the escape of heat from the inside of the room in winter and reduce the heating load can be provided together with heat shielding properties.

"Heat-insulating properties" as used herein is defined as having a normal emissivity value measured in accordance with JIS R3106-2008 of 0.50 or less. If the normal emissivity value is 0.50 or less, a heat transmission coefficient of less than 5.1 W/(m²·K), which is being used as an indication of heat insulation according to the former JIS A5759 C1, can be easily satisfied.

Furthermore, it is more preferable to configure the transparent heat-shielding member having a transparent screen function according to the present invention so as to have a normal emissivity value measured in accordance with JIS R3106-2008 of 0.30 or less. With this configuration, far infrared rays can be more efficiently reflected, and thus when the transparent heat-shielding member according to the present invention is used by being attached to a transparent substrate such as, for example, a window pane by using a transparent pressure-sensitive adhesive or the like, high heat-insulating properties that further suppress the escape of heat from the inside of the room in winter and further reduce the heating load can be provided together with heat shielding properties. If the normal emissivity value is 0.30 or less, a heat transmission coefficient of 4.5 W/(m²·K) or less can be easily satisfied.

According to the present invention, it is possible to provide a transparent heat-shielding member or a transparent heat-shielding/heat-insulating member that provides excellent heat shielding properties or heat-shielding/heat-insulating properties when used as a solar control transparent window film for saving energy, and that has a transparent screen function that provides excellent viewability from both sides of a screen onto which an image is projected when used as a transparent screen for digital signage, in particular, in terms of reflective viewability from the projector side, excellent brightness (luminance) and image clarity (less blur) and that allows the background to be transparently viewed.

DETAILED DESCRIPTION OF THE INVENTION

A transparent heat-shielding member having a transparent screen function according to the present invention includes a transparent base substrate, an infrared reflective layer and a transparent screen function layer. The infrared reflective layer includes at least one selected from a metal oxide layer and a metal nitride layer, and a metal layer. The transparent screen function layer is formed of a light diffusing layer. The light diffusing layer contains light diffusing particles and a transparent resin. The light diffusing particles are dispersed in the transparent resin. The transparent heat-shielding member has a visible light reflectance measured in accordance with JIS R3106-1998 of 12% or more and 30% or less, a haze value measured in accordance with JIS K7136-2000 of 5% or more and 35% or less, and a shading coefficient measured in accordance with JIS A5759-2008 of 0.69 or less.

Hereinafter, an example of a configuration of a transparent heat-shielding member according to the present invention will be described with reference to the drawings.

Figure 1:
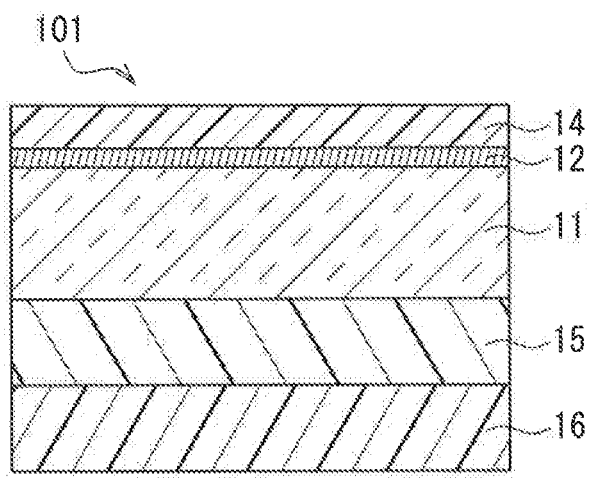
FIG. 1 is a schematic cross-sectional view showing an example of a transparent heat-shielding member having a transparent screen function according to the present invention.

FIG. 1 is a schematic cross-sectional view showing an example of a transparent heat-shielding member having a transparent screen function according to the present invention. In FIG. 1, a transparent heat-shielding member 101 having a transparent screen function has a configuration including an infrared reflective layer 12 and a protective layer 14 on one surface of a transparent base substrate 11, and a light diffusing layer 15 and a pressure-sensitive adhesive layer 16 on the other surface of the transparent base substrate 11. Although not illustrated, the transparent heat-shielding member 101 includes a release film on the pressure-sensitive adhesive layer 16.

Figure 2:
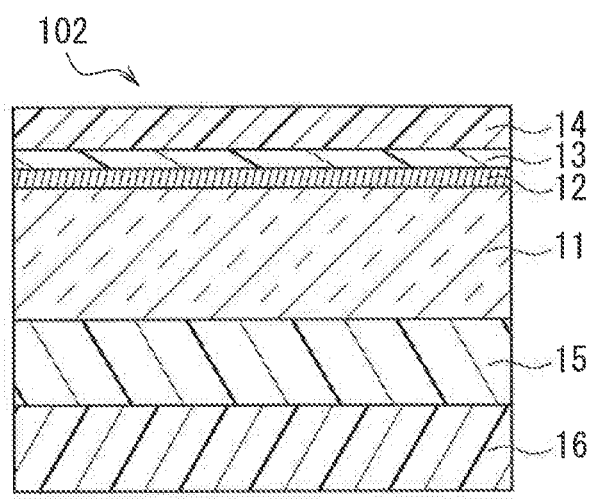
FIG. 2 is a schematic cross-sectional view showing another example of a transparent heat-shielding member having a transparent screen function according to the present invention.

FIG. 2 is a schematic cross-sectional view showing another example of a transparent heat-shielding member having a transparent screen function according to the present invention. In FIG. 2, a transparent heat-shielding member 102 having a transparent screen function has a configuration including an infrared reflective layer 12, a primer layer 13 and a protective layer 14 on one surface of a transparent base substrate 11, and a light diffusing layer 15 and a pressure-sensitive adhesive layer 16 on the other surface of the transparent base substrate 11.

Figure 3:
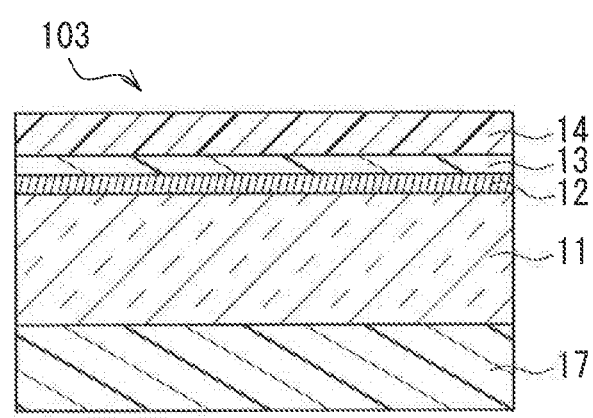
FIG. 3 is a schematic cross-sectional view showing another example of a transparent heat-shielding member having a transparent screen function according to the present invention.

FIG. 3 is a schematic cross-sectional view showing another example of a transparent heat-shielding member having a transparent screen function according to the present invention. In FIG. 3, a transparent heat-shielding member 103 having a transparent screen function has a configuration obtained by replacing the light diffusing layer 15 and the pressure-sensitive adhesive layer 16 showing in FIG. 1 by a light diffusing pressure-sensitive adhesive layer 17.

Figure 4:
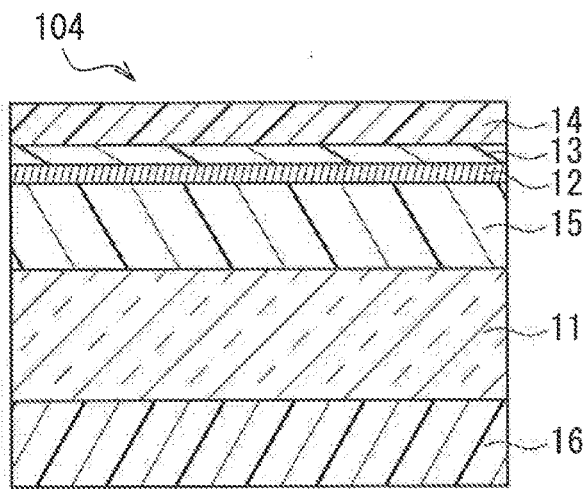
FIG. 4 is a schematic cross-sectional view showing another example of a transparent heat-shielding member having a transparent screen function according to the present invention.

FIG. 4 is a schematic cross-sectional view showing another example of a transparent heat-shielding member having a transparent screen function according to the present invention. In FIG. 4, a transparent heat-shielding member 104 having a transparent screen function has a configuration including a light diffusing layer 15, an infrared reflective layer 12, a primer layer 13 and a protective layer 14 on one surface of a transparent base substrate 11, and a pressure-sensitive adhesive layer 16 on the other surface of the transparent base substrate 11.

Figure 5:
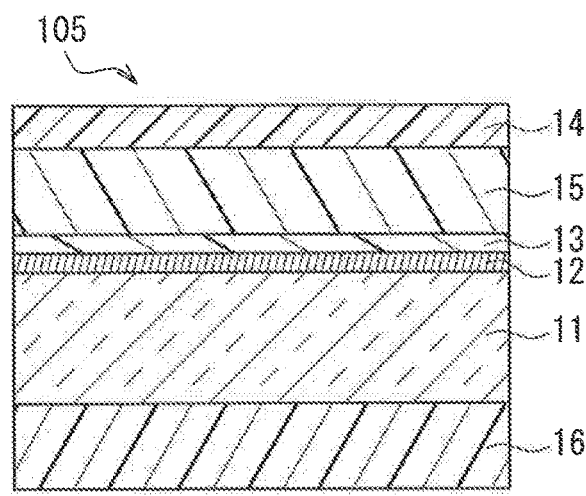
FIG. 5 is a schematic cross-sectional view showing another example of a transparent heat-shielding member having a transparent screen function according to the present invention.

FIG. 5 is a schematic cross-sectional view showing another example of a transparent heat-shielding member having a transparent screen function according to the present invention. In FIG. 5, a transparent heat-shielding member 105 having a transparent screen function has a configuration including an infrared reflective layer 12, a primer layer 13, a light diffusing layer 15 and a protective layer 14 on one surface of a transparent base substrate 11, and a pressure-sensitive adhesive layer 16 on the other surface of the transparent base substrate 11.

Figure 6:
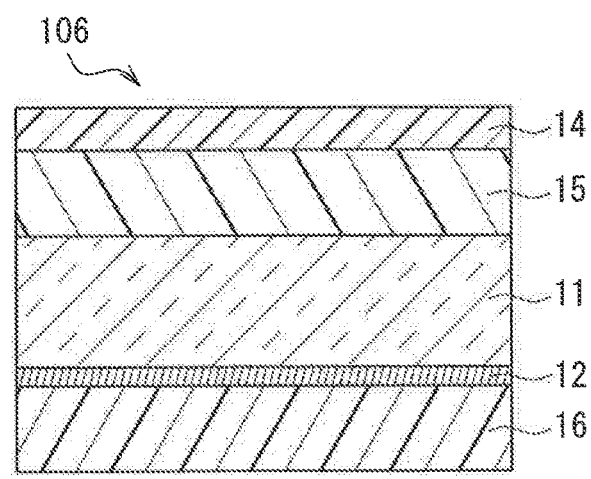
FIG. 6 is a schematic cross-sectional view showing another example of a transparent heat-shielding member having a transparent screen function according to the present invention.

FIG. 6 is a schematic cross-sectional view showing another example of a transparent heat-shielding member having a transparent screen function according to the present invention. In FIG. 6, a transparent heat-shielding member 106 having a transparent screen function has a configuration including a light diffusing layer 15 and a protective layer 14 on one surface of a transparent base substrate 11, and an infrared reflective layer 12 and a pressure-sensitive adhesive layer 16 on the other surface of the transparent base substrate 11.

Figure 7:
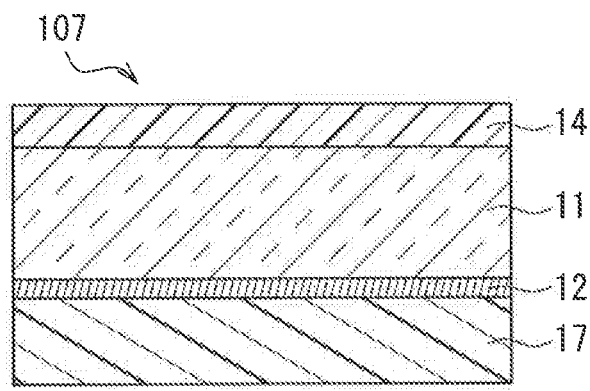
FIG. 7 is a schematic cross-sectional view showing another example of a transparent heat-shielding member having a transparent screen function according to the present invention.

FIG. 7 is a schematic cross-sectional view showing another example of a transparent heat-shielding member having a transparent screen function according to the present invention. In FIG. 7, a transparent heat-shielding member 107 having a transparent screen function has a configuration including a protective layer 14 on one surface of a transparent base substrate 11, and an infrared reflective layer 12 and a light diffusing pressure-sensitive adhesive layer 17 on the other surface of the transparent base substrate 11.

Figure 8:
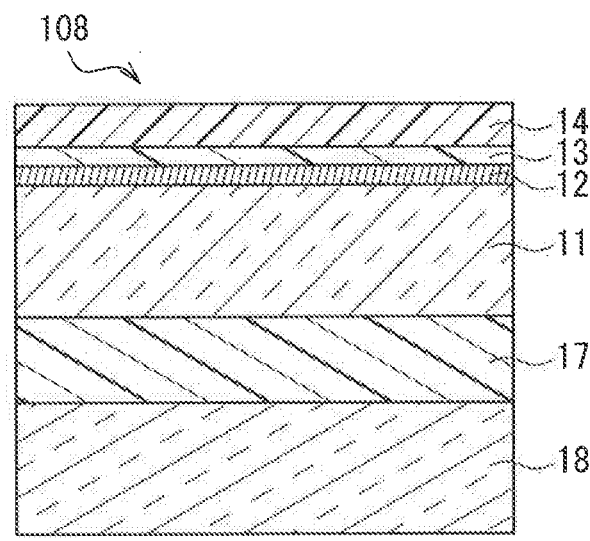
FIG. 8 is a schematic cross-sectional view showing an example in which a transparent heat-shielding member having a transparent screen function according to the present invention is attached to a glass plate.

FIG. 8 is a schematic cross-sectional view showing an example in which a transparent heat-shielding member having a transparent screen function according to the present invention is attached to a glass plate. In FIG. 8, a transparent heat-shielding member 108 having a transparent screen function has a configuration including an infrared reflective layer 12, a primer layer 13 and a protective layer 14 on one surface of a transparent base substrate 11, and a light diffusing pressure-sensitive adhesive layer 17 and a glass plate 18 on the other surface of the transparent base substrate 11.

Figure 9:
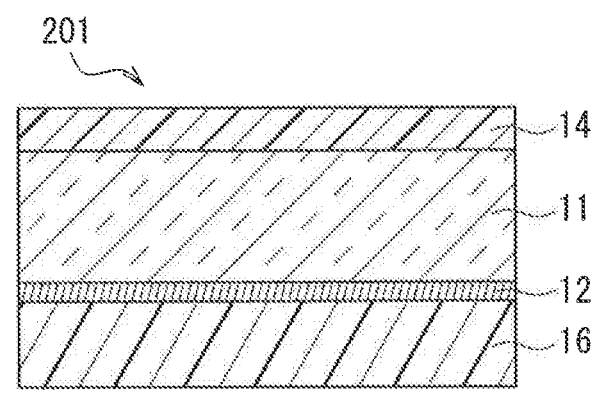
FIG. 9 is a schematic cross-sectional view showing an example of a conventional transparent heat-shielding member.

FIG. 9 is a schematic cross-sectional view showing an example of a conventional transparent heat-shielding member. In FIG. 9, a transparent heat-shielding member 201 has a configuration including a protective layer 14 on one surface of a transparent base substrate 11, and an infrared reflective layer 12 and a pressure-sensitive adhesive layer 16 on the other surface of the transparent base substrate 11.

Figure 10:
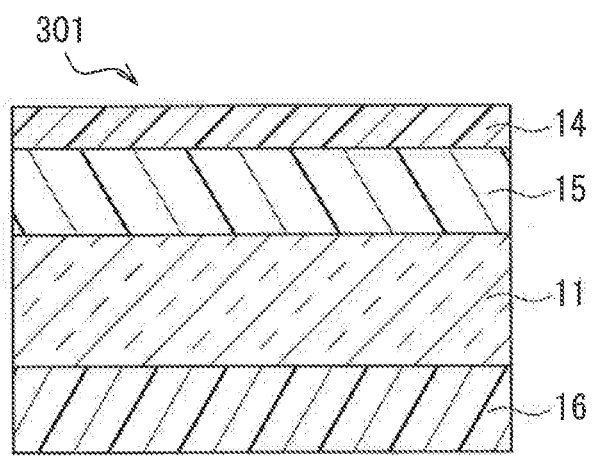
FIG. 10 is a schematic cross-sectional view showing an example of a conventional transmissive transparent screen.

FIG. 10 is a schematic cross-sectional view showing an example of a conventional transmissive transparent screen. In FIG. 10, a transparent screen 301 has a configuration including a light diffusing layer 15 and a protective layer 14 on one surface of a transparent base substrate 11, and a pressure-sensitive adhesive layer 16 on the other surface of the transparent base substrate 11.

Transparent Base Substrate

There is no particular limitation on the transparent base substrate included in the transparent heat-shielding member having a transparent screen function according to the present invention as long as the transparent base substrate has optical transparency. As the transparent base substrate, it is possible to use a film or sheet formed from, for example, a resin such as a polyester resin (for example, polyethylene terephthalate, polyethylene naphthalate or the like), a polycarbonate resin, a polyacrylic acid ester resin (for example, polymethyl methacrylate or the like), an alicyclic polyolefin resin, a polystyrene resin (for example, polystyrene, an acrylonitrile-styrene copolymer (AS resin) or the like), a polyvinyl chloride resin, a polyvinyl acetate resin, a polyethersulfone resin, a cellulose resin (for example, diacetyl cellulose, triacetyl cellulose or the like), or a norbornene resin. As the method for forming the resin into a film or sheet, it is possible to use an extrusion method, a calendering method, a compression molding method, an injection molding method, a method in which any of the above resins is dissolved in a solvent and thereafter subjected to casting, or the like. The resin may further contain additives such as an antioxidant, a flame retardant, an anti-heat resistant agent, an ultraviolet absorbing agent, a lubricant, and an anti-static agent. An adhesion promotion layer may be provided on the transparent base substrate as needed. The transparent base substrate has a thickness of, for example, 10 to 500 µm, and preferably has a thickness of 25 to 125 µm considering the processability and the cost.

Infrared Reflective Layer

The infrared reflective layer included in the transparent heat-shielding member having a transparent screen function according to the present invention is composed of a stack including at least one selected from a metal oxide layer and a metal nitride layer, and a metal layer. The infrared reflective layer preferably has a configuration in which two layers, namely (1) a metal layer and (2) a metal oxide layer or a metal nitride layer, are stacked in this order on the transparent base substrate, or a configuration in which three layers, namely (1) a metal oxide layer or a metal nitride layer, (2) a metal layer and (3) a metal oxide layer or a metal nitride layer, are stacked in this order. Among these, from the viewpoint of improving visible light transmittance, it is more preferable to have a configuration in which three layers, namely (1) a metal oxide layer or a metal nitride layer, (2) a metal layer and (3) a metal oxide layer or a metal nitride layer, are stacked in this order on the transparent base substrate. By using this configuration, it is possible to improve visible light transmittance while maintaining infrared reflective performance. Also, the infrared reflective layer may have, on the transparent base substrate, for example, a stack configuration including four layers such as a metal layer, a metal oxide layer, a metal layer and a metal oxide layer, a stack configuration including six layers or eight layers, a stack configuration including five layers such as a metal oxide layer, a metal layer, a metal oxide layer, a metal layer and a metal oxide layer, or a stack configuration including seven layers or nine layers as needed, as long as the effects of the present invention are not impaired.

Also, a metal layer or a metal suboxide layer in which the metal is partially oxidized may be provided between a metal layer and a metal oxide layer or between a metal layer and a metal nitride layer as a barrier layer for preventing corrosion of the metal layer.

As the material for forming the metal layer, among commonly used metals, it is possible to use those having a high electric conductivity and excellent far infrared reflective performance as appropriate, such as silver, copper, gold, platinum and aluminum, and alloys thereof, but among these metals, it is preferable to use silver having the highest electric conductivity or a silver alloy to form the metal layer. Any of these materials can be used to form the metal layer directly on the transparent base substrate, on a metal oxide layer or a metal nitride layer that has been formed in advance on the transparent base substrate, or on a metal oxide layer or a metal nitride layer included in a stack in which a metal layer and a metal oxide layer or a metal nitride layer are repeatedly stacked, the stack having been formed in advance on the transparent base substrate, by using a sputtering method, a vapor deposition method or a dry coating method such as a plasma CVD method. The first metal layer may be formed on the transparent base substrate via another layer such as an adhesion promotion layer, a hardcoat layer or a light diffusing layer.

As the materials for forming the metal oxide layer and the metal nitride layer, it is preferable to use, from the viewpoint of improving visible light transmittance, a dielectric having a refractive index of 1.7 to 2.8, which can be used as a light compensation layer having an antireflection function for the thin metal film. For example, a metal oxide such as indium tin oxide, indium zinc oxide, indium oxide, titanium oxide, tin oxide, zinc oxide, zinc tin oxide, niobium oxide or aluminum oxide and a metal nitride such as silicon nitride or aluminum nitride can be used as appropriate. Any of these materials can be used to form the metal oxide layer or the metal nitride layer directly on the transparent base substrate, on a metal layer that has been formed in advance on the transparent base substrate, or on a metal layer included in a stack in which a metal oxide layer or a metal nitride layer and a metal layer are repeatedly stacked, the stack having been formed in advance on the transparent base substrate, by using a sputtering method, a vapor deposition method or a dry coating method such as a plasma CVD method. The first metal oxide layer or metal nitride layer may be formed on the transparent base substrate via another layer such as an adhesion promotion layer, a hardcoat layer or a light diffusing layer.

There is no particular limitation on the thickness of each of the metal layer, the metal oxide layer and the metal nitride layer, and the thickness may be adjusted as appropriate by taking into consideration the final near infrared reflective performance (shading coefficient), far infrared reflective performance (normal emissivity), visible light reflectance and visible light transmittance as required by the transparent heat-shielding member having a transparent screen function described above.

The thickness of the metal layer is, although it depends on the refractive index, thickness, the stack configuration and the like of the metal oxide layer or the metal nitride layer stacked on the metal layer, preferably adjusted as appropriate within a range of 5 to 20 nm. If the thickness is less than 5 nm, the infrared reflective performance of the transparent heat-shielding member having a transparent screen function is reduced, as a result of which the heat-shielding performance and the heat-insulating performance may also be reduced. If the thickness is greater than 20 nm, the visible light transmittance is reduced, as a result of which the transparent viewability of the background may be reduced. By configuring the metal layer so as to have a thickness within the above-described range and combining the metal layer with a metal oxide layer or a metal nitride layer, which will be described below, as appropriate to form a stack configuration, the transparent heat-shielding member having a transparent screen function can have a shading coefficient of 0.69 or less.

The thickness of the metal oxide layer and the metal nitride layer is preferably adjusted as appropriate within a range of 2 to 80 nm according to the refractive index of the material used for the metal layer and the thickness of the metal layer. If the thickness is less than 2 nm, the effect as a light compensation layer for the metal layer is small, and a significant improvement cannot be expected in the visible light transmittance of the transparent heat-shielding member having a transparent screen function. Thus, the transparent viewability of the background may be reduced. In addition, because the metal oxide layer and the metal nitride layer also serve to suppress corrosion of the metal layer, the effect of suppressing corrosion of the metal layer may be reduced if the thickness is less than 2 nm. If the thickness is greater than 80 nm, a further effect as a light compensation layer for the metal layer cannot be obtained. On the contrary, the visible light transmittance will gradually decrease, and the transparent viewability of the background may be reduced.

The visible light reflectance of the transparent heat-shielding member having the infrared reflective layer needs to be set to 12% or more and 30% or less in order to, when an image is projected by a projector, provide a reflected image having excellent brightness (luminance) and image clarity (less blur) in terms of reflective viewability from the projector side, without preventing the viewability of a transmitted image. If the visible light reflectance is less than 12%, the brightness (luminance) and the image clarity (less blur) of the reflected image may be poor. If the visible light reflectance is greater than 30%, the reflected image is strongly glittered or has a strong half-mirror appearance, and the transparent viewability of the background may be reduced, or the brightness (luminance) of the transmitted image may be reduced.

In order to set the visible light reflectance to 12% or more and 30% or less, it is preferable to adjust the thicknesses of the metal layer, the metal oxide layer and the metal nitride layer as appropriate to be within the ranges described above. It is preferable to set the visible light reflectance to 15% or more and 25% or less. By setting the visible light reflectance to be within this range, it is possible to properly reflect the projected light from a projector and make up for the low backward light scattering properties of the light diffusing layer, as a result of which the brightness (luminance) and the image clarity (less blur) of the reflected image can be made better.

With a conventional reflective screen, a technique is used in which as a reflective layer for reflecting visible light, a metal vapor deposition layer or a transfer metal foil layer made of, for example, aluminum or the like, a layer including flakes obtained by pulverizing a metal vapor deposition film or a metal foil dispersed therein or coated therewith, or the like is used. However, the reflective screen has a non-transparent configuration that basically transmits little visible light. In other words, in the case where these materials are used, there is a limit on control of the balance between transmittance and reflectance of visible light and uniforming of the thin metal film and the prevention of corrosion of the thin metal film when the visible light transmittance is improved. Even if the transmittance is forcibly improved, the transmittance can be practically increased to about 40 to 50% at most.

In contrast, as described above, a feature of the present invention is that the following points are found: by stacking the metal oxide layer and/or the metal nitride layer on the metal layer, the balance between the visible light transmittance required to secure background viewability and the visible light reflectance required to improve the viewability of the reflected image is controlled while the infrared reflective performance required for heat-shielding or heat-shielding/heat-insulation is maintained; and by combining a stacked body of the metal layer, the metal oxide layer and/or the metal nitride layer with the light diffusing layer, in terms of reflective viewability from the projector side of a reflected image, the brightness (luminance) and the image clarity (less blur) are unexpectedly improved without preventing the viewability of a transmitted image.

Also, it is preferable to set the average reflectance for far-infrared light having a wavelength of 5 to 25.2 μm of the infrared reflective layer to 80% or more. By doing so, the normal emissivity value of the transparent heat-shielding member of the present invention can be easily designed to 0.50 or less, and thus the heat-insulating function can be preferably provided.

Light Diffusing Layer

The light diffusing layer constituting the transparent screen function layer of the transparent heat-shielding member according to the present invention is composed of a layer in which light diffusing particles are dispersed in a transparent resin. In general, the transparent resin has a refractive index different from that of the light diffusing particles dispersed therein. The refractive index of the transparent resin is preferably selected from a range of 1.45 to 1.60 as appropriate. There is no particular limitation on the refractive index of the light diffusing particles as long as the refractive index is different from (lower or higher than) that of the transparent resin, but the refractive index of the light diffusing particles is preferably selected from a range of 1.30 to 2.40 as appropriate, and more preferably from a range of 1.40 to 1.65 as appropriate. It is preferable that the absolute value of the difference in refractive index between the transparent resin and the light diffusing particles is set to be within a range of 0.01 to 0.20. By setting the absolute value of the difference in refractive index to be within this range, it is possible to obtain a light diffusing layer having a desired haze value.

There is no particular limitation on the transparent resin used for the light diffusing layer as long as it has optical transparency, and it is possible to use as appropriate known resins, adhesives and pressure-sensitive adhesives including thermoplastic resins, thermosetting resins and ionizing radiation curable resins such as a (meth)acrylic resin, an acrylic urethane resin, a polyester resin, a polyester acrylate resin, a polyurethane (meth)acrylate resin, an epoxy (meth)acrylate resin, a polyurethane resin, an epoxy resin, a polycarbonate resin, a cellulose resin, an acetal resin, a vinyl resin, a polyethylene resin, a polystyrene resin, a polypropylene resin, an ethylene/vinyl acetate resin, a polyamide resin, a polyimide resin, a melamine resin, a phenol resin, a silicone resin and a fluororesin; and rubber resins such as a natural rubber resin, a recycled rubber resin, a chloroprene rubber resin, a nitrile rubber resin and a styrene/butadiene rubber resin. The transparent resin may further contain one or more additives such as a crosslinking agent, an ultraviolet absorbing agent, an antioxidant, an anti-static agent, a flame retardant agent, a plasticizing agent and a coloring agent according to the purpose. The refractive index of the transparent resin is preferably selected from a range of 1.45 to 1.60 as appropriate.

Among the transparent resins listed above, it is particularly preferable to use a pressure-sensitive adhesive that has pressure sensitive adhesiveness at room temperature. It is preferable to use a pressure-sensitive adhesive as the transparent resin in which light diffusing particles are dispersed, in terms of processing cost because the functions of the light diffusing layer and the pressure-sensitive adhesive layer can be implemented by a single layer. Examples of the pressure-sensitive adhesive include an acrylic resin, a silicone resin, a polyester resin, an epoxy resin, and a polyurethane resin. In particular, an acrylic resin is more preferably used because it has high optical transparency, is highly reliable, has proven useful in many applications, and is relatively inexpensive.

Examples of the acrylic pressure-sensitive adhesive include a homopolymer or a copolymer of acrylic monomers such as acrylic acid and an ester thereof methacrylic acid and an ester thereof, acrylamide, and acrylonitrile. Other examples include a copolymer containing at least one of the acrylic monomers listed above and a vinyl monomer such as vinyl acetate, maleic anhydride, or styrene. In particular, a preferable acrylic pressure-sensitive adhesive can be a copolymer obtained by copolymerizing, as appropriate, a main alkyl acrylate monomer serving as a component for exhibiting pressure sensitive adhesiveness such as methyl acrylate, ethyl acrylate, butyl acrylate and 2-ethylhexyl acrylate; a monomer serving as a component for improving a cohesive force such as a vinyl acetate, acrylamide, acrylonitrile, styrene and methacrylate; and a functional group-containing monomer serving as a component for further improving the pressure sensitive adhesiveness and providing a crosslinking point such as acrylic acid, methacrylic acid, itaconic acid, crotonic acid, maleic anhydride, hydroxyl ethyl methacrylate, hydroxyl propyl methacrylate, dimethyl aminoethyl methacrylate, methylol acrylamide, and a glycidyl methacrylate. The acrylic pressure-sensitive adhesive preferably has a Tg (glass transition temperature) of −60° C. to −10° C. and a weight-average molecular weight of 100,000 to 2,000,000, and more preferably a weight-average molecular weight of 500,000 to 1,000,000. The acrylic pressure-sensitive adhesive may be mixed with one or more crosslinking agents such as an isocyanate-based crosslinking agent, an epoxy-based crosslinking agent, and a metal chelate-based crosslinking agent as needed.

Also, as the acrylic pressure-sensitive adhesive, it is possible to use an ionizing radiation curable coating material obtained by blending a photopolymerization initiator and the like with an oligomer having a (meth)acryl group at the terminal or side chain and a (meth)acrylic monomer. When such an ionizing radiation curable coating material is applied to a transparent base substrate and then irradiated with ionizing radiation such as ultraviolet rays, the coating layer is formed into a pressure-sensitive adhesive, which can be used as the acrylic pressure-sensitive adhesive.

As the light diffusing particles used for the light diffusing layer, it is possible to use inorganic fine particles and organic fine particles. The refractive index of the light diffusing particles is preferably selected as appropriate from a range of 1.30 to 2.40, and more preferably from a range of 1.40 to 1.65. As long as the refractive index of the light diffusing particles is within the range, the absolute value of the difference in refractive index with respect to the transparent resin can be set to be within a desired range, and thus a light diffusing layer having a desired haze value can be obtained.

As the inorganic fine particles, it is possible to use, as appropriate, conventionally known inorganic fine particles of silica, alumina, rutile titanium dioxide, anatase titanium dioxide, zinc oxide, zinc sulfide, white lead, antimony oxide, zinc antimonate, lead titanate, potassium titanate, barium titanate, zirconium oxide, cerium oxide, hafnium oxide, tantalum pentoxide, niobium pentoxide, yttrium oxide, chromium oxide, tin oxide, molybdenum oxide, indium tin oxide, antimony-doped tin oxide, calcium carbonate, talc, oxide glass such as silicate glass, phosphate glass or borate glass, diamond or the like.

As the organic fine particles, it is possible to use, as appropriate, conventionally known organic fine particles of, for example, an acrylic polymer, an acrylonitrile polymer, a styrene-acrylic copolymer, a vinyl acetate-acrylic copolymer, a vinyl acetate polymer, an ethylene-vinyl acetate copolymer, a chlorinated polyolefin polymer, a multi-component copolymer such as an ethylene-vinyl acetate-acrylic copolymer, SBR, NBR, MBR, carboxylated SBR, carboxylated NBR, carboxylated MBR, a polyvinylchloride resin, a polyvinylidene chloride resin, a polyester resin, a polyolefin resin, a polyurethane resin, a polymethacrylate resin, a polytetrafluoroethylene resin, a polymethyl methacrylate resin, a polycarbonate resin, a polyvinyl acetal resin, a rosin ester resin, an episulfide resin, an epoxy resin, a silicone resin, a silicone-acrylic resin, a melamine resin or the like.

The shape of the light diffusing particles may be any shape such as a spherical shape, a flat shape, an amorphous shape, a star-like shape, or a spherical star shape. Also, the light diffusing particles may be hollow particles or core-shell particles. The light diffusing particles may be used alone or in combination of two or more.

The light diffusing particles preferably has an average particle size of 0.2 to 10 μm and more preferably 1 to 5 μm. If the average particle size is less than 0.2 μm, the light diffusing performance will be low, which may result in poor viewability of projected images, as well as a cost increase and a reduction in the physical properties of the light diffusing layer as a result of addition of an excessively large amount of the light diffusing particles. If on the other hand, the average particle size is greater than 10 μm, the visible light transmittance may be reduced or the contrast may be reduced due to glittering.

The amount of light diffusing particles in the light diffusing layer is, although it depends on the refractive indices of the transparent resin and the light diffusing particles used, the size of the light diffusing particles, the thickness of the light diffusing layer, the dispersed state of the light diffusing particles and the like, preferably 0.3 to 20 parts by mass and more preferably 1 to 10 parts by mass with respect to 100 parts by mass of the transparent resin. If the amount is less than 0.3 parts by mass, the haze value of the transparent heat-shielding member having a transparent screen function may be less than 5%, and as a result, the light diffusing performance may be insufficient and the viewability of a projected image from a projector may be poor. If the amount is greater than 20 parts by mass, the haze value may exceed 35%, and as a result, the background viewability or the visible light transmittance may be reduced. By blending the light diffusing particles in an amount within the above range, it is possible to obtain a light diffusing layer having excellent light diffusing performance.

The thickness of the light diffusing layer is determined as appropriate according to the size and amount of the light diffusing particles used, the refractive indices of the transparent resin and the light diffusing particles, and the like. By adjusting the thickness, the transparent heat-shielding member having a transparent screen function can have a haze value within a desired range. The thickness of the light diffusing layer is preferably 5 to 200 μm and more preferably 10 to 100 μm. If the thickness is less than 5 μm, the haze value may also be less than 5%, and as a result, the light diffusing performance may be insufficient and the viewability of a projected image from a projector may be poor. If the thickness is greater than 200 μm, a problem may occur in handling or workability, and the haze value may exceed 35%, and as a result, the background viewability or the visible light transmittance may be reduced.

In the case where the above-described pressure-sensitive adhesive is used as the transparent resin, the thickness of the light diffusing layer is preferably 10 to 150 μm. If the thickness is less than 10 μm, the pressure-sensitive adhesive force with respect to a transparent substrate serving as an adherend may decrease. If the thickness is greater than 150 μm, when a web of the transparent heat-shielding member having a transparent screen function is finally wound and its ends are slit, the slit end faces may be sticky and dust or the like may adhere thereto, or a problem may occur in handling or workability.

The light diffusing layer may be formed directly on a transparent base substrate or via an adhesion promotion layer, an adhesive layer or the like. Alternatively, the light diffusing layer may be formed directly on the infrared reflective layer or via a primer layer or the like.

There is no particular limitation on the method for forming the light diffusing layer, but it is preferable to form the light diffusing layer by using a method in which a coating material obtained by dispersing the light diffusing particles described above in a solution in which the transparent resin described above is dissolved in an organic solvent such as ethyl acetate, butyl acetate, acetone, methyl ethyl ketone, methyl isobutyl ketone, cyclohexanone, toluene or xylene is applied onto the transparent base substrate side of the transparent base substrate on which the infrared reflective layer has been formed or onto the infrared reflective layer side, and then dried.

Also, in the case where a pressure-sensitive adhesive is used as the transparent resin, the light diffusing layer can be formed by a method in which a pressure-sensitive adhesive solution in which the light diffusing particles are dispersed is applied onto the transparent base substrate side of the transparent base substrate on which the infrared reflective layer has been formed or onto the infrared reflective layer side, and then dried, and thereafter a release film is laminated onto the spread pressure-sensitive adhesive layer, or a method in which a pressure-sensitive adhesive solution in which the light diffusing particles are dispersed is applied onto a release film, and then dried, and thereafter the transparent base substrate side of the transparent base substrate on which the infrared reflective layer has been formed or the infrared reflective layer side is bonded onto the spread pressure-sensitive adhesive layer. Furthermore, the light diffusing layer can also be formed by a method in which a film obtained by extrusion of a solution obtained by hot melt kneading the light diffusing particles in a transparent resin such as polyolefin or polyethylene terephthalate is bonded to the transparent base substrate side of the transparent base substrate on which the infrared reflective layer has been formed or the infrared reflective layer side by using a transparent adhesive.

The dispersion of the light diffusing particles in the transparent resin can be performed by using various mixing/agitating apparatuses and dispersion apparatuses such as a Disper, an Ajiter, a ball mill, an Attritor and a sand mill. A dispersing agent for dispersing the light diffusing particles may be added and dispersed as needed. It is preferable that the coating material in which the light diffusing particles are dispersed is defoamed before application so as to reduce, as much as possible, air bubbles that remain in the light diffusing layer formed by application of the coating material and drying.

The application of the coating material in which the light diffusing particles are dispersed can be performed by using a coater such as a die coater, a comma coater, a reverse coater, a dam coater, a doctor bar coater, a gravure coater, a micro-gravure coater or a roll coater.

The light diffusing layer may be cured, as needed, through cross-linking suitable for a functional group contained in the transparent resin used such as for example, cross-linking due to heat by addition of a crosslinking agent having multiple functional groups, cross-linking by irradiation with ionizing radiation, or the like.

Protective Layer

With the transparent heat-shielding member having a transparent screen function, it is preferable to form, as a hardcoat layer, a protective layer containing at least an ionizing radiation curable resin or a thermosetting resin on the topmost surface layer (air side) in the case where it is used by being attached to a transparent substrate by using a pressure-sensitive adhesive or an adhesive. From the viewpoint of improving scratch resistance, it is more preferable to form a protective layer containing at least an ionizing radiation curable resin as the hardcoat layer. By doing so, it is possible to prevent, when the transparent heat-shielding member having a transparent screen function is attached to a transparent substrate or is cleaned, prevent the surface from being damaged.

As the protective layer, it is possible to use a transparent ionizing radiation curable resin containing at least an ionizing radiation curable resin monomer, an ionizing radiation curable resin oligomer, or a mixture thereof. The protective layer made of the ionizing radiation curable resin is formed through curing by irradiation with ionizing radiation.

As the ionizing radiation curable resin monomer, it is possible to use, for example, a multifunctional acrylate monomer having two or more unsaturated groups or the like. Specific examples include: acrylates such as ethylene glycol di(meth)acrylate, diethylene glycol di(meth)acrylate, triethylene glycol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, and 1,2,3-cyclohexane trimethacrylate; polyurethane polyacrylates such as pentaerythritol triacrylate hexamethylene diisocyanate urethane prepolymer; esters produced from a polyhydric alcohol and (meth)acrylic acid such as polyester polyacrylate; vinylbenzenes such as 1,4-divinylbenzene, 4-vinyl benzoic acid-2-acryloyl ethyl ester and 1,4-divinyl cyclohexanone, and derivatives thereof.

Also, in order to further improve the adhesion between the ionizing radiation curable resin and an underlying layer such as the infrared reflective layer, a (meth)acrylic acid derivative having a polar group such as a phosphoric acid group, a sulfonic acid group or an amide group may be added to the ionizing radiation curable resin monomer and used.

Furthermore, in order to further improve the wettability of a solution of the ionizing radiation curable resin monomer when applied to the underlying layer such as the infrared reflective layer, a leveling agent such as a fluorine-based leveling agent, a silicone-based leveling agent or an acrylic leveling agent may be added to the solution of the ionizing radiation curable resin monomer and used.

As the ionizing radiation curable resin oligomer, it is possible to use, for example, a multifunctional acrylate oligomer such as a urethane-based multifunctional acrylate oligomer, an epoxy-based multifunctional acrylate oligomer or a polyester-based multifunctional acrylate oligomer. Among them, it is preferable to use a urethane-based multifunctional acrylate oligomer because the hardness and flexibility of the protective layer to be formed can be easily balanced. The urethane-based multifunctional acrylate oligomer can be obtained by reacting, for example, a urethane acrylate having an acrylate polymer as the main chain backbone and a reactive acryloyl group at the terminal.

Also, in order to further improve the adhesion to the underlying layer such as the infrared reflective layer, a (meth)acrylic acid derivative having a polar group such as a phosphoric acid group, a sulfonic acid group or an amide group may be added to the ionizing radiation curable resin oligomer and used.

Furthermore, in order to further improve the wettability of a solution of the ionizing radiation curable resin oligomer when applied to the underlying layer such as the infrared reflective layer, a leveling agent such as a fluorine-based leveling agent, a silicone-based leveling agent or an acrylic leveling agent may be added to the solution of the ionizing radiation curable resin oligomer and used.

As the multifunctional acrylate oligomer, commercially available products can be used. It is possible to use, for example, BPZA-66 and BPZA-100 (trade names) available from Kyoeisha Chemical Co. Ltd., Acrit 8KX-012C and Acrit 8KX-077 (trade name) available from Taisei Fine Chemical Co., Ltd., Hitaloid 7975, Hitaloid 7975D and Hitaloid 7988 (trade name) available from Hitachi Chemical Co. Ltd., ACA-200M, ACA-230AA, ACA-Z250, ACA-Z251, ACA-Z300 and ACA-Z320 (trade name) available from Daicel-Allnex Ltd., and the like.

There is no particular limitation on the weight-average molecular weight of the ionizing radiation curable resin oligomer, but in the case where it is applied so as to form a protective layer on a primer layer made of a modified polyolefin resin, which will be described later, the weight-average molecular weight is preferably 10,000 to 100,000. By setting the weight-average molecular weight to be within the above range, the ease of application of a protective layer-forming coating solution used to form the protective layer can be further improved, and the scratch resistance of the formed protective layer can be made sufficient. In the present invention, the weight-average molecular weight of the oligomer is measured by a GPC (gel permeation chromatography) method.

If the weight-average molecular weight is less than 10,000, when the protective layer-forming coating solution is applied onto a primer layer made of a modified polyolefin resin, which will be described later, the protective layer-forming coating solution may not uniformly spread and wet on the primer layer made of a modified polyolefin resin, and may be repelled. If, on the other hand, the weight-average molecular weight is greater than 100,000, the number of unsaturated linking groups serving as crosslinking reaction sites per molecular weight is small, and thus the crosslink density of the coating film is not improved when cured by ionizing radiation, and the scratch resistance of the protective layer may be insufficient.

For the protective layer described above, it is possible to use a transparent resin including at least a thermosetting resin. As the thermosetting resin, it is possible to use, for example, a silicone resin, a phenol resin, a urea resin, a, diallyl phthalate resin, a melamine resin, an unsaturated polyester resin, a polyurethane resin, an epoxy resin, and the like. The protective layer made of the thermosetting resin is formed by heating and curing a thermally curable resin precursor.

In order to improve the hardness of the formed protective layer, the thermally curable resin precursor is preferably a silicone resin precursor. Among silicone resin precursors, it is most preferable to use a thermosetting resin precursor made of an alkoxysilane compound.

Examples of the thermosetting resin precursor made of an alkoxysilane compound include KP-86 (trade name) available from Shin-Etsu Silicones Co., Ltd., SHC-900 and Tosguard 510 (trade name) available from Momentive Performance Materials Japan Inc.

The protective layer can be formed directly on any one of the transparent base substrate, the infrared reflective layer and the light diffusing layer according to the configuration of the infrared reflective layer and the light diffusing layer formed on the transparent base substrate, or via a primer layer. In order to cause the transparent heat-shielding member having a transparent screen function to have a normal emissivity of 0.50 or less so as to provide heat-insulating properties thereto, the protective layer is preferably formed directly on the infrared reflective layer or via a primer layer. If the light diffusing layer is formed by using a resin having hardcoat properties, the light diffusing layer itself can be used as the protective layer.

There is no particular limitation on the thickness of the protective layer, but the thickness is preferably adjusted as appropriate within a range of 0.05 to 5 μm. If the thickness is less than 0.05 μm, the scratch resistance of the protective layer may be insufficient. If the thickness is greater than 5 μm, because the transparent ionizing radiation curable resin or the thermosetting resin forming the protective layer contains a large number of C=O groups, C—O groups, aromatic groups in its chemical structure, infrared vibrational absorption is likely to occur in the region of far infrared rays having a wavelength of 5 to 25.2 μm, and the protective layer absorbs light directly applied thereto and light reflected by the infrared reflective layer, causing an increasing in emissivity. Even if the protective layer is formed directly on the infrared reflective layer or via a primer layer, the normal emissivity of the transparent heat-shielding member having a transparent screen function exceeds 0.50, and it may not be possible to obtain sufficient heat-insulating properties.

Furthermore, it is more preferable to adjust the thickness of the protective layer to be within a range of 0.05 to 2 μm as appropriate. By adjusting the thickness to be within this range, when the protective layer is formed directly on the infrared reflective layer or via a primer layer, the transparent heat-shielding member having a transparent screen function can have a normal emissivity of 0.30 or less, and provide even higher heat-insulating properties.

The protective layer may contain, as an anti-blocking agent or a scratch resistance improving agent, a filler such as an organic or inorganic substance as appropriate in an amount that does not increase the absorption of light having a wavelength in the infrared region.

As the filler, for example, an inorganic filler or an organic filler can be used within a range that does not affect optical properties such as total light transmittance and haze value. Examples of the inorganic filler include silica, talc, barium sulfate, calcium carbonate, aluminum hydroxide, aluminum oxide, magnesium hydroxide, magnesium oxide, zinc oxide, titanium oxide, zirconium oxide, mica, and zinc stearate. Likewise, examples of the organic filler include a silicone resin-based filler, an acrylic resin-based filler, a styrene resin-based filler, a fluororesin-based filler, and a polybutadiene resin-based filler.

These fillers may be used alone or in combination of two or more. There is no particular limitation on the average particle size (number average diameter) of the filler as long as anti-blocking properties or scratch resistance can be provided, and the characteristics and the external appearance of the transparent heat-shielding member are not affected. However, the average particle size of the filler is preferably smaller than the thickness of the protective layer.

There is no particular limitation on the method for forming the protective layer, but the protective layer can be formed by a method in which a solution prepared by dissolving a transparent resin containing the ionizing radiation curable resin or the thermosetting resin described above in an appropriately selected organic solvent is applied directly onto any one of the transparent base substrate, the infrared reflective layer and the light diffusing layer or via a primer layer by using a coater such as a micro-gravure coater, a gravure coater, a die water, a reverse coater or a roll coater, and then dried. The protective layer can be cross-linked and cured by irradiation with ionizing radiation or application of thermal energy after the organic solvent has been dried.

Primer Layer

For the primer layer, it is possible to use a transparent resin such as a polyester resin, a polyurethane resin, a synthetic rubber resin, an acrylic acid ester resin, and a polyolefin resin modified with an acid, an acid anhydride or a hydroxyl group, but for the primer layer used when the protective layer is formed on the infrared reflective layer, it is preferable to use a polyolefin resin modified with an acid, an acid anhydride or a hydroxyl group. The polyolefin resin modified with an acid, an acid anhydride or a hydroxyl group has a surprisingly strong interaction with both the metal oxide layer or the metal nitride layer of the infrared reflective layer and the protective layer containing the ionizing radiation curable resin or thermosetting resin, and thus even better adhesion can be obtained between the protective layer and the infrared reflective layer. Furthermore, the polyolefin resin modified with an acid anhydride or a hydroxyl group contains a polyolefin in its main backbone, and the number of C=O groups, C—O groups and aromatic groups is not so large. Accordingly, infrared vibrational absorption is unlikely to occur in the region of far infrared rays having a wavelength of 5 to 25.2 μm, and the increase in normal emissivity and heat transmission coefficient can be suppressed, and thus it is unlikely to interfere with providing heat-insulating properties.

There is no particular limitation on the polyolefin resin serving as the backbone of the polyolefin resin modified with an acid, an acid anhydride or a hydroxyl group, but polypropylene and a polypropylene-α-olefin copolymer are preferably used. Examples of α-olefin in the polypropylene-α-olefin copolymer include ethylene, 1-butene, 1-heptene, 1-octene and 4-methyl-1-pentene. They may be used alone or in combination. There is no particular limitation on the proportion of polypropylene in the polypropylene-α-olefin copolymer, but the proportion of polypropylene is preferably 50 mol % or more and 90 mol % or less from the viewpoint of solubility in organic solvents.

There is no particular limitation on the modified polyolefin resin having an acidic group, but it is possible to use, for example, a polyolefin resin that has been acid-modified by graft copolymerization of the polyolefin resin with at least one of α,β-unsaturated carboxylic acid and an acid anhydride thereof. There is no particular limitation on the α,β-unsaturated carboxylic acid and the acid anhydride thereof, but examples thereof include maleic acid, itaconic acid, citraconic acid, fumaric acid, aconitic acid, crotonic acid, isocrotonic acid, acrylic acid, and anhydrides thereof. They may be used alone or in combination of two or more. Among them, from the viewpoint of versatility, it is preferable to perform modification by graft copolymerization of the polyolefin resin with at least one of maleic anhydride and itaconic anhydride.

The amount of graft copolymerization of the α,β-unsaturated carboxylic acid or the acid anhydride with respect to the polyolefin resin is preferably 0.2 to 30 mass %, and more preferably 1.0 to 10.0 mass %. If the amount of graft copolymerization is less than 0.2 mass %, the solubility in organic solvents is lowered, which may cause the stability as a primer layer-forming coating solution to be poor, or the adhesion to the infrared reflective layer to be insufficient. If, on the other hand, the amount of graft copolymerization is greater than 30 mass %, the absorption of light having a wavelength in the infrared region starts increasing, which may increase the normal emissivity and the heat transmission coefficient.

The modified polyolefin resin having an acidic group can be produced by a known method such as a melting method or a solution method.

The modified polyolefin resin having an acidic group may be acrylic-modified by further adding a (meth)acrylic acid monomer so as to further improve the solubility in polar solvents, the adhesion to the hardcoat agent or the like, and the compatibility. To be specific, this can be obtained by causing an unsaturated bond-containing compound having a functional group (hydroxyl group or glycidyl group) reactive to an acid-modified portion of the modified polyolefin resin having an acidic group to react so as to introduce double bonds, and thereafter performing graft copolymerization using a (meth)acrylic acid monomer.

As the unsaturated bond-containing compound having a functional group, it is preferable to use, for example, 2-hydroxyethyl acrylate, 2-hydroxypropyl acrylate, 4-hydroxybutyl acrylate, polypropylene glycol acrylate, 2-hydroxyethyl methacrylate, 2-hydroxypropyl methacrylate, 4-hydroxybutyl methacrylate, polypropylene glycol methacrylate, glycidyl acrylate, glycidyl methacrylate, and the like. It is preferable to use the unsaturated bond-containing compound in an amount of about 10 to 90 mass % with respect to the modified polyolefin resin having an acidic group.

As the (meth)acrylic acid monomer that is subjected to graft copolymerization after double bonds are introduced into the modified polyolefin resin having an acidic group, (meth)acrylic acid or a (meth)acrylic acid ester can be used. As the (meth)acrylic acid, at least one of acrylic acid and methacrylic acid can be used. Examples of the (meth)acrylic acid ester include methyl acrylate, ethyl acrylate, propyl acrylate, n-butyl acrylate, isobutyl acrylate, t-butyl acrylate, 2-ethylhexyl acrylate, lauryl acrylate, stearyl acrylate, 2-hydroxyethyl acrylate, 2-hydroxypropyl acrylate, 4-hydroxybutyl acrylate, glycidyl acrylate, cyclohexyl acrylate, polypropylene glycol acrylate, methyl methacrylate, ethyl methacrylate, propyl methacrylate, n-butyl methacrylate, isobutyl methacrylate, t-butyl methacrylate, 2-ethylhexyl methacrylate, lauryl methacrylate, stearyl methacrylate, 2-hydroxyethyl methacrylate, 2-hydroxypropyl methacrylate, 4-hydroxybutyl methacrylate, glycidyl methacrylate, cyclohexyl methacrylate, polypropylene glycol methacrylate. These (meth)acrylic acid monomers can be used alone or in combination of two or more.

Also, the modified polyolefin resin having a hydroxyl group can be obtained by introducing double bonds to the modified polyolefin resin having an acidic group, and thereafter performing graft copolymerization using a hydroxyl group-containing (meth)acrylic acid monomer such as 2-hydroxyethyl acrylate, 2-hydroxypropyl acrylate, 4-hydroxybutyl acrylate, 2-hydroxyethyl methacrylate, 2-hydroxypropyl methacrylate, or 4-hydroxybutyl methacrylate.

The modified polyolefin resin preferably has a weight-average molecular weight measured by a GPC method of 10,000 to 200,000. If the weight-average molecular weight is less than 10,000, the strength as the primer layer may be poor. If the weight-average molecular weight is greater than 200,000, the viscosity of the primer layer-forming coating solution increases, which is likely to reduce the workability.

As the modified polyolefin resin having an acidic group, commercially available products can be used such as, for example, Unistole P902 (trade name) available from Mitsui Chemicals Inc., Hardlen (trade name) available from Toyobo Co., Ltd., Auroren (trade name) available from Nippon Paper Chemicals Co., Ltd., Surflen (trade name) available from Mitsubishi Chemical Corporation, Sumifitt (trade name) available from Sumika Chemtex Co., Ltd., and Zaikthene (trade name) available from Sumitomo Seika Chemicals Co., Ltd. Likewise, as the modified polyolefin resin having a hydroxyl group, commercially available products can be used such as, for example, Unistole P901 (trade name) available from Mitsui Chemicals Inc., and Polytale (trade name) available from Mitsubishi Chemical Corporation.

The primer layer made of the polyolefin resin modified with an acid, an acid anhydride or a hydroxyl group preferably has a thickness of 0.05 to 10 μm, and more preferably 0.05 to 5 μm. If the thickness is less than 0.05 μm, the adhesion between the infrared reflective layer and the protective layer may be insufficient. If the thickness is greater than 10 μm, the visible light transmittance may decrease depending on the type of modified polyolefin resin used and the amount of modification. Also, large absorption takes place in the region of far infrared rays having a wavelength of 5 to 25.2 μm, as a result of which the normal emissivity and the heat transmission coefficient may increase.

The primer layer may contain, as an anti-blocking agent, a filler such as an organic or inorganic substance as appropriate in an amount that does not increase the absorption of light having a wavelength in the infrared region.

As the filler, for example, an inorganic filler or an organic filler can be used within a range that does not affect optical properties such as total light transmittance and haze value. Examples of the inorganic filler include silica, talc, barium sulfate, calcium carbonate, aluminum hydroxide, aluminum oxide, magnesium hydroxide, magnesium oxide, zinc oxide, titanium oxide, zirconium oxide, mica, and zinc stearate. Likewise, examples of the organic filler include a silicone resin-based filler, an acrylic resin-based filler, a styrene resin-based filler, a fluororesin-based filler, and a polybutadiene resin-based filler.

These fillers may be used alone or in combination of two or more. There is no particular limitation on the average particle size (number average diameter) of the filler as long as anti-blocking properties can be provided, and the characteristics and the external appearance of the transparent heat-shielding member are not affected. However, the average particle size of the filler is preferably about 0.5 to 2.0 times the thickness of the primer layer.

There is no particular limitation on the method for forming the primer layer, but the primer layer can be formed by a method in which a solution prepared by dissolving a transparent resin such as a polyester resin, a polyurethane resin, a synthetic rubber resin, an acrylic acid ester resin, a polyolefin resin modified with an acid, an acid anhydride or a hydroxyl group as listed above in an appropriately selected organic solvent is applied directly onto any one of the transparent base substrate, the infrared reflective layer and the light diffusing layer by using a coater such as a microgravure coater, a gravure coater, a die coater, a reverse coater or a roll coater, and then dried.

Transparent Substrate

There is no particular limitation on the transparent substrate to which the transparent heat-shielding member having a transparent screen function according to the present invention is attached via a transparent pressure-sensitive adhesive, an adhesive or the like, or by electrostatic attraction as long as it has optical transparency, and a plate-like material made of glass or plastic can be preferably used. There is no particular limitation on the type of glass, but it is preferable to use, for example, silicic acid salt glass such as silicate glass, alkali silicate glass, soda lime glass, potash lime glass, lead glass, barium glass, borosilicate glass, or the like. There is no particular limitation on the type of plastic, but it is preferable to use, for example, a polyacrylic acid ester resin, a polycarbonate resin, a polyvinylchloride resin, a polyarylate resin, a polyethylene resin, a polypropylene resin, a polyester resin, or the like.

Pressure-Sensitive Adhesive Layer

The transparent heat-shielding member having a transparent screen function according to the present invention is easily attached to a transparent substrate such as a window pane by forming a pressure-sensitive adhesive layer or the like on the side opposite to the side where the protective layer is formed. As the material of the pressure-sensitive adhesive layer, a material having a high visible light transmittance and a small difference in refractive index with respect to the transparent base substrate is preferably used. Examples thereof include an acrylic resin, a silicone resin, a polyester resin, an epoxy resin and a polyurethane resin. In particular, an acrylic resin is preferably used because it has high optical transparency, has good balance between wettability and pressure-sensitive adhesive force, is reliable, has proven useful in many applications, and is relatively inexpensive. As the acrylic pressure-sensitive adhesive, any of the pressure-sensitive adhesives listed as the material for the light diffusing layer above can be used in the same formulation.

The pressure-sensitive adhesive layer preferably contains an ultraviolet absorbing agent in order to suppress the degradation of the transparent heat-shielding member having a transparent screen function caused by ultraviolet rays of sunlight and the like. Also, the pressure-sensitive adhesive layer preferably includes a release film on the pressure-sensitive adhesive layer until the transparent heat-shielding member having a transparent screen function is attached to a transparent substrate and used.

The thickness of the pressure-sensitive adhesive is preferably 10 to 150 μm. If the thickness is less than 10 μm, the pressure-sensitive adhesive force with respect to a transparent substrate serving as an adherend may decrease. If the thickness is greater than 150 μm, when a web of the transparent heat-shielding member having a transparent screen function is finally wound and its ends are slit, the slit end faces may be sticky and dust or the like may adhere thereto, or a problem may occur in handling or workability.

There is no particular limitation on the method for forming the pressure-sensitive adhesive layer on the transparent heat-shielding member having a transparent screen function, but it is preferable to form the pressure-sensitive adhesive layer by a method in which a solution prepared by dissolving any of the above-listed resins for forming the pressure-sensitive adhesive layer in an appropriately selected organic solvent is first applied onto a release film by using a coater such as a die coater, a comma coater, a reverse coater, a dam coater, a doctor bar coater, a gravure coater, a micro-gravure coater or a roll coater and dried, and thereafter an exposed surface of the pressure-sensitive adhesive layer is attached to the surface of the transparent heat-shielding member having a transparent screen function that is opposite to the surface on which the protective layer is formed.

Hereinafter, the present invention will be described in detail by way of examples. It is to be noted, however, that the present invention is not limited to the examples given below. Also, in the following description, unless otherwise stated, the term "part(s)" means "part(s) by mass".

Example 1

Formation of Infrared Reflective Layer

A polyethylene terephthalate (PET) film A4300 (trade name, thickness: 50 μm) available from Toyobo Co., Ltd. having both surfaces subjected to an adhesion promotion treatment was first prepared as a transparent base substrate. Next, an infrared reflective layer having a three-layer structure composed of a 29 nm thick indium tin oxide (ITO) layer, a 13 nm thick silver (Ag) layer and a 29 nm thick indium tin oxide (ITO) layer was formed on one side of the PET film by a sputtering method.

Formation of Primer Layer

A primer layer-forming coating solution was prepared by mixing, in a Disper, 10 parts of modified polyolefin resin solution Hardlen NS-2002 (trade name, acid-modified type, solid content: 20 mass %) available from Toyobo Co., Ltd., and 80 parts of methyl cyclohexane and 20 parts of methyl isobutyl ketone as diluting solvents. Next, the primer layer-forming coating solution was applied onto the infrared reflective layer by using a micro-gravure coater and dried so as to have a dry thickness of 0.1 μm, and a primer layer was thereby formed on the infrared reflective layer.

Formation of Protective Layer

A protective layer-forming coating solution was prepared by mixing, in a Disper, 125 parts of ionizing radiation curable resin oligomer solution BPZA-66 (trade name, solid content: 80 mass %, weight-average molecular weight: 20,000) available from Kyoeisha Chemical Co. Ltd., 3 parts of photopolymerization initiator Irgacure 819 (trade name) available from BASF Ltd. and 375 parts of methyl isobutyl ketone. Next, the protective layer-forming coating solution was applied onto the primer layer by using a micro-gravure coater and dried so as to have a dry thickness of 1.4 μm, and thereafter irradiated with ultraviolet rays in an amount of 300 mJ/cm$^2$ with a high-pressure mercury lamp so as to cure the coating solution. A hardcoat protective layer was thereby formed on the primer layer.

In the manner as described above, an infrared reflective film having a protective layer on an infrared reflective layer was produced.

Formation of Light Diffusing Pressure-Sensitive Adhesive Layer

First, a PET film NS-38+A (trade name, thickness: 38 μm) available from Nakamoto Packs Co., Ltd. having a silicone-treated surface was prepared as a release film. Also, a light diffusing pressure-sensitive adhesive layer forming coating solution was prepared by dispersing and mixing 0.88 parts (3.5 parts with respect to 100 parts of pressure-sensitive adhesive resin) of amorphous silicone resin fine particles TOSPEARL 240 (trade name, average particle size: 4.0 μm, refractive index: 1.42) available from Momentive Performance Materials Japan Inc., 1.25 parts of ultraviolet absorbing agent (benzophenone-based ultraviolet absorbing agent) available from Wako Pure Chemical Industries, Ltd. and 0.27 parts of crosslinking agent E-AX (trade name, solid content: 5%) available from Soken Chemical & Engineering Co., Ltd. in 100 parts of acrylic pressure-sensitive adhesive solution SK-Dyne 2094 (trade name, solid content: 25 mass %, refractive index: 1.49) available from Soken Chemical & Engineering Co., Ltd. by using a Disper and then defoaming the resulting mixture.

Next, the light diffusing pressure-sensitive adhesive layer-forming coating solution was applied onto the silicone-treated surface of a PET film serving as the release film and dried so as to have a dry thickness of 25 μm, and a light diffusing pressure-sensitive adhesive layer was thereby formed. Furthermore, an exposed surface of the light diffusing pressure-sensitive adhesive layer was attached to the surface of the infrared reflective film having the protective layer on which the protective layer was not formed, and an infrared reflective film (transparent heat-shielding member) in which the light diffusing pressure-sensitive adhesive layer was formed on one surface of the PET film base substrate, and the infrared reflective layer, the primer layer and the protective layer were formed on the other surface was thereby produced.

Attachment to Glass Substrate

First, a 3 mm-thick float glass sheet (available from Nippon Sheet Glass Co. Ltd.) was prepared as a glass substrate. Next, the release film of the light diffusing pressure-sensitive adhesive layer of the infrared reflective film (transparent heat-shielding member) in which the light diffusing pressure-sensitive adhesive layer was formed on one surface of the PET film base substrate, and the infrared reflective layer, the primer layer and the protective layer were formed on the other surface was removed, and the light diffusing pressure-sensitive adhesive layer-side surface was attached to the float glass.

Example 2

An infrared reflective film (transparent heat-shielding member) in which a light diffusing pressure-sensitive adhesive layer was formed on one surface of a PET film base substrate, and an infrared reflective layer, a primer layer and a protective layer were formed on the other surface was produced in the same manner as in Example 1 except that the thickness of the silver (Ag) layer of the infrared reflective layer of Example 1 was changed to 10 nm. Then, the produced infrared reflective film was attached to a glass substrate.

Example 3

An infrared reflective film (transparent heat-shielding member) in which a light diffusing pressure-sensitive adhesive layer was formed on one surface of a PET Um base substrate, and an infrared reflective layer, a primer layer and a protective layer were formed on the other surface was produced in the same manner as in Example 1 except that the thickness of the silver (Ag) layer of the infrared reflective layer of Example 1 was changed to 15 nm. Then, the produced infrared reflective film was attached to a glass substrate.

Example 4

An infrared reflective film (transparent heat-shielding member) in which a light diffusing pressure-sensitive adhesive layer was formed on one surface of a PET film base substrate, and an infrared reflective layer, a primer layer and a protective layer were formed on the other surface was produced in the same manner as in Example 1 except that the infrared reflective layer of Example 1 was replaced by an infrared reflective layer having a three-layer structure composed of a 30 nm thick aluminum nitride (ALN) layer, a 18 nm thick silver (Ag) layer and a 30 nm thick aluminum nitride (ALN) layer. Then, the produced infrared reflective film was attached to a glass substrate.

Example 5

An infrared reflective film (transparent heat-shielding member) in which a light diffusing pressure-sensitive adhesive layer was formed on one surface of a PET film base substrate, and an infrared reflective layer, a primer layer and a protective layer were formed on the other surface was produced in the same manner as in Example 1 except that the amount of amorphous silicone resin fine particles TOSPEARL 240 (trade name, average particle size: 4.0 μm) added to form the light diffusing pressure-sensitive adhesive layer of Example 1 was changed to 0.25 parts (1.0 part with respect to 100 parts of pressure-sensitive adhesive resin). Then, the produced infrared reflective film was attached to a glass substrate.

Example 6

An infrared reflective film (transparent heat-shielding member) in which a light diffusing pressure-sensitive adhesive layer was formed on one surface of a PET film base substrate, and an infrared reflective layer, a primer layer and a protective layer were formed on the other surface was produced in the same manner as in Example 1 except that the amount of amorphous silicone resin fine particles TOSPEARL 240 (trade name, average particle size: 4.0 μm) added to form the light diffusing pressure-sensitive adhesive layer of Example 1 was changed to 1.13 parts (4.5 parts with respect to 100 parts of pressure-sensitive adhesive resin). Then, the produced infrared reflective film was attached to a glass substrate.

Example 7

An infrared reflective film (transparent heat-shielding member) in which a light diffusing pressure-sensitive adhesive layer was formed on one surface of a PET film base substrate, and an infrared reflective layer, a primer layer and a protective layer were formed on the other surface was produced in the same manner as in Example 1 except that the thickness of the protective layer of Example 1 was changed to 0.5 μm. Then, the produced infrared reflective film was attached to a glass substrate.

Example 8

An infrared reflective film (transparent heat-shielding member) in which a light diffusing pressure-sensitive adhesive layer was formed on one surface of a PET film base substrate, and an infrared reflective layer, a primer layer and a protective layer were formed on the other surface was produced in the same manner as in Example 1 except that the thickness of the protective layer of Example 1 was changed to 3.5 μm. Then, the produced infrared reflective film was attached to a glass substrate.

Example 9

An infrared reflective film (transparent heat-shielding member) in which a light diffusing pressure-sensitive adhesive layer was formed on one surface of a PET film base substrate, and an infrared reflective layer, a primer layer and a protective layer were formed on the other surface was produced in the same manner as in Example 1 except that the thickness of the protective layer of Example 1 was changed to 5.5 μm. Then, the produced infrared reflective film was attached to a glass substrate.

Example 10

Formation of Infrared Reflective Layer

First, a polyethylene terephthalate (PET) film A4300 (trade name, thickness: 50 μm) available from Toyobo Co., Ltd. having two adhesion promoted surfaces was prepared as a transparent base substrate. Next, an infrared reflective layer having a three-layer structure composed of a 29 nm thick indium tin oxide (ITO) layer, a 13 nm thick silver (Ag) layer and a 29 nm thick indium tin oxide (ITO) layer was formed on one side of the PET film by a sputtering method.

Formation of Protective Layer

A protective layer-forming coating solution was prepared by mixing, in a Disper, 125 parts of ionizing radiation curable resin oligomer solution BPZA-66 (trade name, solid content: 80 mass %, weight-average molecular weight: 20,000) available from Kyoeisha Chemical Co. Ltd., 1.92 parts (0.5 parts with respect to 100 parts of ionizing radiation curable resin oligomer) of porous spherical silica particles Organosol LA-OS26BK (trade name, average particle size: 0.7 μm, solid content: 26 mass %) available from Nissan Chemical Industries, Ltd., 3 parts of photopolymerization initiator Irgacure 819 (trade name) available from BASF Ltd., and 375 parts of methyl isobutyl ketone. Next, a hardcoat protective layer was formed by applying the protective layer-forming coating solution onto a surface of the PET film on which the infrared reflective layer was not formed by using a micro-gravure coater and drying the same so as to have a dry thickness of 2.0 μm, and thereafter performing irradiation with ultraviolet rays in an amount of 300 mJ/cm$^2$ with a high-pressure mercury lamp so as to cure the coating solution.

In the manner as described above, an infrared reflective film having a protective layer on the opposite side of an infrared reflective layer was produced.

Formation of Light Diffusing Pressure-Sensitive Adhesive Layer

First, a PET film NS-38+A (trade name, thickness: 38 μm) available from Nakamoto Packs Co., Ltd. having a silicone-treated surface was prepared as a release film. Also, a light diffusing pressure-sensitive adhesive layer-forming coating solution was prepared by dispersing and mixing 0.88 parts (3.5 parts with respect to 100 parts of pressure-sensitive adhesive resin) of amorphous silicone resin fine particles TOSPEARL 240 (trade name, average particle size: 4.0 μm, refractive index: 1.42) available from Momentive Performance Materials Japan Inc., 1.25 parts of ultraviolet absorbing agent (benzophenone-based ultraviolet absorbing agent) available from Wako Pure Chemical Industries, Ltd. and 0.27 parts of crosslinking agent E-AX (trade name, solid content: 5%) available from Soken Chemical & Engineering Co., Ltd. in 100 parts of acrylic pressure-sensitive adhesive solution SK-Dyne 2094 (trade name, solid content: 25 mass %, refractive index: 1.49) available from Soken Chemical & Engineering Co., Ltd. by using a Disper, and then defoaming the resulting mixture.

Next, a light diffusing pressure-sensitive adhesive layer was formed by applying the light diffusing pressure-sensitive adhesive layer-forming coating solution onto the silicone-treated surface of the PET film serving as the release film by using a die coater and drying the same so as to have a dry thickness of 25 μm. Furthermore, an exposed surface of the light diffusing pressure-sensitive adhesive layer was attached to the surface of the infrared reflective film having the protective layer on which the infrared reflective layer was formed, and an infrared reflective film (transparent heat-shielding member) in which the light diffusing pressure-sensitive adhesive layer and the infrared reflective layer were formed on one surface of the PET film base substrate, and the protective layer was formed on the other surface was thereby produced.

Attachment to Glass Substrate

First, a 3 mm-thick float glass sheet (available from Nippon Sheet Glass Co. Ltd.) was prepared as a glass substrate. Next, the release film of the light diffusing pressure-sensitive adhesive layer of the infrared reflective film (transparent heat-shielding member) in which the light diffusing pressure-sensitive adhesive layer and the infrared reflective layer were formed on one surface of the PET film base substrate, and the protective layer was formed on the other surface was removed, and the light diffusing pressure-sensitive adhesive layer-side surface was attached to the float glass.

Example 11

An infrared reflective film having a protective layer on an infrared reflective layer was first produced in the same manner as in Example 1, except that the thickness of the protective layer of Example 1 was changed to 2.0 μm.

Formation of Light Diffusing Layer

A light diffusing layer-forming coating solution was prepared by dispersing and mixing 0.88 parts (3.5 parts with respect to 100 parts of acrylic resin) amorphous silicone resin fine particles TOSPEARL 240 (trade name, average particle size: 4.0 μm) available from Momentive Performance Materials Japan Inc., 1.25 parts of ultraviolet absorbing agent (benzophenone-based ultraviolet absorbing agent) available from Wako Pure Chemical Industries, Ltd., 75 parts of methyl ethyl ketone and 75 parts of toluene in 100 parts of acrylic resin Dianal BR-90 (trade name, refractive index: 1.49) available from Mitsubishi Rayon Co., Ltd. by using a Disper, and then defoaming the resulting mixture.

Next, a light diffusing layer was formed by applying the light diffusing layer-forming coating solution onto the surface of the infrared reflective film having the protective layer on the infrared reflective layer on which the protective layer was not formed by using a die coater and drying the same so as to have a dry thickness of 25 μm.

Formation of Pressure-Sensitive Adhesive Layer

First, a PET film NS-38+A (trade name, thickness: 38 μm) available from Nakamoto Packs Co., Ltd. having a silicone-treated surface was prepared as a release film. Also, a pressure-sensitive adhesive layer-forming coating solution was prepared by dispersing and mixing 1.25 parts of ultraviolet absorbing agent (benzophenone-based ultraviolet absorbing agent) available from Wako Pure Chemical Industries, Ltd. and 0.27 parts of crosslinking agent E-AX (trade name, solid content: 5%) available from Soken Chemical & Engineering Co., Ltd. in 100 parts of acrylic pressure-sensitive adhesive solution SK-Dyne 2094 (trade name, solid content: 25 mass %, refractive index: 1.49) available from Soken Chemical & Engineering Co., Ltd. by using a Disper, and then defoaming the resulting mixture.

Next, a pressure-sensitive adhesive layer was formed by applying the pressure-sensitive adhesive layer-forming coating solution onto the silicone-treated surface of the PET film serving as the release film and drying the same so as to have a dry thickness of 25 μm. Furthermore, an exposed surface of the pressure-sensitive adhesive layer was attached to the surface of the infrared reflective film having the protective layer on which the light diffusing layer was formed, and an infrared reflective film (transparent heat-shielding member) in which the pressure-sensitive adhesive layer and the light diffusing layer were formed on one surface of the PET film base substrate, and the infrared reflective layer, the primer layer and the protective layer were formed on the other surface was produced.

Attachment to Glass Substrate

First, a 3 mm-thick float glass sheet (available from Nippon Sheet Glass Co. Ltd.) was prepared as a glass substrate. Next, the release film of the pressure-sensitive adhesive layer of the infrared reflective film (transparent heat-shielding member) in which the pressure-sensitive adhesive layer and the light diffusing layer were formed on one surface of the PET film base substrate, and the infrared reflective layer, the primer layer and the protective layer were formed on the other surface was removed, and the pressure-sensitive adhesive layer-side surface was attached to the float glass.

Example 12

Formation of Infrared Reflective Layer

First, a polyethylene terephthalate (PET) film A4300 (trade name, thickness: 50 μm) available from Toyobo Co., Ltd. having two adhesion promoted surfaces was prepared as a transparent base substrate. Next, an infrared reflective layer having a three-layer structure composed of a 29 nm thick indium tin oxide (ITO) layer, a 13 nm thick silver (Ag) layer and a 29 nm thick indium tin oxide (ITO) layer was formed on one side of the PET film by a sputtering method.

Formation of Light Diffusing Layer

A light diffusing layer-forming coating solution was prepared by dispersing and mixing 0.88 parts (3.5 parts with respect to 100 parts of pressure-sensitive adhesive resin) of amorphous silicone resin fine particles TOSPEARL 240 (trade name, average particle size: 4.0 μm) available from Momentive Performance Materials Japan Inc., 1.25 parts of ultraviolet absorbing agent (benzophenone-based ultraviolet absorbing agent) available from Wako Pure Chemical Industries, Ltd., 75 parts of methyl ethyl ketone and 75 parts of toluene in 100 parts of acrylic resin Dianal BR-90 (trade name, refractive index: 1.49) available from Mitsubishi Rayon Co., Ltd by using a Disper, and then defoaming the resulting mixture.

Next, a light diffusing layer was formed by applying the light diffusing layer-forming coating solution onto the infrared reflective layer of the PET film on which the infrared reflective layer was formed by using a die coater and drying the same so as to have a dry thickness of 25 μm.

Formation of Protective Layer

A protective layer-forming coating solution was prepared by mixing, in a Disper, 125 parts of ionizing radiation curable resin oligomer solution BPZA-66 (trade name, solid content: 80 mass %, weight-average molecular weight: 20,000) available from Kyoeisha Chemical Co. Ltd., 1.92 parts (0.5 parts with respect to 100 parts of ionizing radiation curable resin oligomer) of porous spherical silica particles Organosol LA-OS26BK (trade name, average particle size: 0.7 μm, solid content: 26 mass %) available from Nissan Chemical Industries, Ltd., 3 parts of photopolymerization initiator Irgacure 819 (trade name) available from BASF Ltd., and 375 parts of methyl isobutyl ketone. Next, a hardcoat protective layer was formed on the light diffusing layer by applying the protective layer-forming coating solution onto the light diffusing layer of the infrared reflective film having the light diffusing layer by using a micro-gravure coater and drying the same so as to have a dry thickness of 2.0 μm, and thereafter performing irradiation with ultraviolet rays in an amount of 300 mJ/cm$^2$ with a high-pressure mercury lamp so as to cure the coating solution.

Formation of Pressure-Sensitive Adhesive Layer

First, a PET film NS-38+A (trade name, thickness: 38 μm) available from Nakamoto Packs Co., Ltd. having a silicone-treated surface was prepared as a release film. Also, a pressure-sensitive adhesive layer-forming coating solution was prepared by dispersing and mixing 1.25 parts of ultraviolet absorbing agent (benzophenone-based ultraviolet absorbing agent) available from Wako Pure Chemical Industries, Ltd. and 0.27 parts of crosslinking agent E-AX (trade name, solid content: 5%) available from Soken Chemical & Engineering Co., Ltd. in 100 parts of acrylic pressure-sensitive adhesive solution. SK-Dyne 2094 (trade name, solid content: 25 mass %, refractive index: 1.49) available from Soken Chemical & Engineering Co., Ltd. by using a Disper, and then defoaming the resulting mixture.

Next, a pressure-sensitive adhesive layer was formed by applying the pressure-sensitive adhesive layer-forming coating solution onto the silicone-treated surface of the PET film serving as the release film and drying the same so as to have a dry thickness of 25 μm. Furthermore, an exposed surface of the pressure-sensitive adhesive layer was attached to the surface of the infrared reflective film having the protective layer on which the infrared reflective layer was not formed, and an infrared reflective film (transparent heat-shielding member) in which the pressure-sensitive adhesive layer was formed on one surface of the PET film base substrate, and the infrared reflective layer, the light diffusing layer and the protective layer were formed on the other surface was produced.

Attachment to Glass Substrate

First, a 3 mm-thick float glass sheet (available from Nippon Sheet Glass Co. Ltd.) was prepared as a glass substrate. Next, the release film of the pressure-sensitive adhesive layer of the infrared reflective film (transparent heat-shielding member) in which the pressure-sensitive adhesive layer was formed on one surface of the PET film base substrate, and the infrared reflective layer, the light diffusing layer and the protective layer were formed on the other surface was removed, and the pressure-sensitive adhesive layer-side surface was attached to the float glass.

Example 13

Formation of Infrared Reflective Layer

First, a polyethylene terephthalate (PET) film A4300 (trade name, thickness: 50 μm) available from Toyobo Co., Ltd. having two adhesion promoted surfaces was prepared as a transparent base substrate. Next, an infrared reflective layer having a three-layer structure composed of a 29 nm thick indium tin oxide (ITO) layer, a 13 nm thick silver (Ag) layer and a 29 nm thick indium tin oxide (ITO) layer was formed on one side of the PET film by a sputtering method.

Formation of Protective Layer

A protective layer-forming coating solution was prepared by mixing, in a Disper, 125 parts of ionizing radiation curable resin oligomer solution BPZA-66 (trade name, solid content: 80 mass %, weight-average molecular weight 20,000) available from Kyoeisha Chemical Co. Ltd., 3 parts of phosphoric acid group-containing methacrylic acid derivative Light Ester P-2M (trade name) available from Kyoeisha Chemical Co. Ltd, 5 parts of photopolymerization initiator Irgacure 819 (trade name) available from BASF Ltd., and 375 parts of methyl isobutyl ketone. Next, a hardcoat protective layer was formed on the infrared reflective layer of the infrared reflective film by applying the protective layer-forming coating solution onto the infrared reflective layer by using a micro-gravure coater and drying the same so as to have a dry thickness of 2.0 μm, and thereafter performing irradiation with ultraviolet rays in an amount of 300 mJ/cm$^2$ with a high-pressure mercury lamp so as to cure the coating solution.

In the manner as described above, an infrared reflective film having a protective layer on an infrared reflective layer was produced.

Formation of Light Diffusing Pressure-Sensitive Adhesive Layer First, a PET film NS-38+A (trade name, thickness: 38 μm) available from Nakamoto Packs Co., Ltd. having a silicone-treated surface was prepared as a release film. Also, a light diffusing pressure-sensitive adhesive layer-forming coating solution was prepared by dispersing and mixing 0.88 parts (3.5 parts with respect to 100 parts of pressure-sensitive adhesive resin) of amorphous silicone resin fine particles TOSPEARL 240 (trade name, average particle size: 4.0 μm, refractive index: 1.42) available from Momentive Performance Materials Japan Inc., 1.25 parts of ultraviolet absorbing agent (benzophenone-based ultraviolet absorbing agent) available from Wako Pure Chemical Industries, Ltd. and 0.27 parts of crosslinking agent E-AX (trade name, solid content: 5%) available from Soken Chemical & Engineering Co., Ltd. in 100 parts of acrylic pressure-sensitive adhesive solution SK-Dyne 2094 (trade name, solid content: 25 mass %, refractive index: 1.49) available from Soken Chemical & Engineering Co., Ltd. by using a Disper, and then defoaming the resulting mixture.

Next, a light diffusing pressure-sensitive adhesive layer was formed by applying the light diffusing pressure-sensitive adhesive layer-forming coating solution onto the silicone-treated surface of the PET film serving as the release film by using a die coater and drying the same so as to have a dry thickness of 25 μm. Furthermore, an exposed surface of the light diffusing pressure-sensitive adhesive layer was attached to the surface of the infrared reflective film having the protective layer on which the protective layer was not formed, and thereby an infrared reflective film (transparent heat-shielding member) in which the light diffusing pressure-sensitive adhesive layer was formed on one surface of the PET film base substrate, and the infrared reflective layer and the protective layer were formed on the other surface was produced.

Attachment to Glass Substrate

First, a 3 mm-thick float glass sheet (available from Nippon Sheet Glass Co. Ltd.) was prepared as a glass substrate. Next, the release film of the light diffusing pressure-sensitive adhesive layer of the infrared reflective film (transparent heat-shielding member) in which the light diffusing pressure-sensitive adhesive layer was formed on one surface of the PET film base substrate, and the infrared reflective layer and the protective layer were formed on the other surface was removed, and the light diffusing pressure-sensitive adhesive layer-side surface was attached to the float glass.

Example 14

An infrared reflective film (transparent heat-shielding member) in which a light diffusing pressure-sensitive adhesive layer was formed on one surface of a PET film base substrate, and an infrared reflective layer, a primer layer and a protective layer were formed on the other surface was produced in the same manner as in Example 1 except that the formation of the protective layer of Example 1 was changed as follows. Then, the produced infrared reflective film was attached to a glass substrate.

Formation of Protective Layer

A silicone hardcoat agent solution SHC-900 (trade name, solid content: 30 mass %) available from Momentive Performance Materials Japan Inc., which is a thermosetting resin, was prepared as a protective layer-forming coating solution. Next, the protective layer-forming coating solution was applied onto the primer layer by using a micro-gravure coater and dried so as to have a dry thickness of 1.4 μm, which was then dried at 120° C. for three minutes, and thereby a hardcoat protective layer was formed on the primer layer.

Comparative Example 1

Formation of Protective Layer

First, a polyethylene terephthalate (PET) film A4300 (trade name, thickness: 50 μm) available from Toyobo Co., Ltd. having two adhesion promoted surfaces was prepared as a transparent base substrate. Next, a protective layer-forming coating solution was prepared by mixing, in a Disper, 125 parts of ionizing radiation curable resin oligomer solution BPZA-66 (trade name, solid content: 80 mass %, weight-average molecular weight 20,000) available from Kyoeisha Chemical Co. Ltd, 3 parts of photopolymerization initiator Irgacure 819 (trade name) available from BASF Ltd., and 375 parts of methyl isobutyl ketone. Next, a hardcoat protective layer was formed by applying the protective layer-forming coating solution onto on one side of the PET film by using a micro-gravure coater and drying the same so as to have a dry thickness of 1.4 μm, and thereafter irradiation with ultraviolet rays in an amount of 300 mJ/cm$^2$ with a high-pressure mercury lamp so as to cure the coating solution.

Formation of Light Diffusing Pressure-Sensitive Adhesive Layer

First, a PET film NS-38+A (trade name, thickness: 38 μm) available from Nakamoto Packs Co., Ltd. having a silicone-treated surface was prepared as the release film. Also, a light effusing pressure-sensitive adhesive layer-forming coating solution was prepared by dispersing and mixing 0.88 parts (3.5 parts with respect to 100 parts of pressure-sensitive adhesive resin) of amorphous silicone resin fine particles TOSPEARL 240 (trade name, average particle size: 4.0 μm, refractive index: 1.42) available from Momentive Performance Materials Inc., 1.25 parts of ultraviolet absorbing agent (benzophenone-based ultraviolet absorbing agent) available from Wako Pure Chemical Industries, Ltd. and 0.27 parts of crosslinking agent E-AX (trade name, solid content: 5%) available from Soken Chemical & Engineering Co., Ltd. in 100 parts of acrylic pressure-sensitive adhesive solution SK-Dyne 2094 (trade name, solid content: 25 mass %, refractive index: 1.49) available from Soken Chemical & Engineering Co., Ltd. by using a Disper, and then defoaming the resulting mixture.

Next, the light diffusing pressure-sensitive adhesive layer-forming coating solution was applied onto the silicone-treated surface of the PET film serving as the release film and dried so as to have a dry thickness of 25 μm, and thereby a light diffusing pressure-sensitive adhesive layer was formed. Furthermore, an exposed surface of the light diffusing pressure-sensitive adhesive layer was attached to the surface of the PET film having the protective layer on which the protective layer was not formed, and thereby a transparent screen film in which the light diffusing pressure-sensitive adhesive layer was formed on one surface of the PET film base substrate and the protective layer was formed on the other surface was produced.

Attachment to Glass Substrate

First, a 3 mm-thick float glass sheet (available from Nippon Sheet Glass Co. Ltd.) was prepared as a glass substrate. Next, the release film of the light diffusing pressure-sensitive adhesive layer of the transparent screen film in which the light diffusing pressure-sensitive adhesive layer was formed on one surface of the PET film base substrate, and the protective layer was formed on the other surface was removed, and the light diffusing pressure-sensitive adhesive layer-side surface was attached to the float glass.

Comparative Example 2

An infrared reflective film having a protective layer on an infrared reflective layer (transparent heat-shielding member) was first produced in the same manner as in Example 1.

Formation of Pressure-Sensitive Adhesive Layer

First, a PET film NS-38+A (trade name, thickness: 38 μm) available from Nakamoto Packs Co., Ltd. having a silicone-treated surface was prepared as a release film. Also, a pressure-sensitive adhesive layer-forming coating solution was prepared by dispersing and mixing 1.25 parts of ultraviolet absorbing agent (benzophenone-based ultraviolet absorbing agent) available from Wako Pure Chemical Industries, Ltd. and 0.27 parts of crosslinking agent E-AX (trade name, solid content: 5%) available from Soken Chemical & Engineering Co., Ltd. in 100 parts of acrylic pressure-sensitive adhesive solution SK-Dyne 2094 (trade name, solid content: 25 mass %, refractive index: 1.49) available from Soken Chemical & Engineering Co., Ltd. by using a Disper, and then defoaming the resulting mixture.

Next, the pressure-sensitive adhesive layer-forming coating solution was applied onto the silicone-treated surface of the PET film serving as the release film and dried so as to have a dry thickness of 25 μm, and thereby a pressure-sensitive adhesive layer was formed. Furthermore, an exposed surface of the pressure-sensitive adhesive layer was attached to the surface of the infrared reflective film having the protective layer on which the protective layer was not formed, and an infrared reflective film (transparent heat-shielding member) in which the pressure-sensitive adhesive layer was formed on one surface of the PET film base substrate, and the infrared reflective layer, the primer layer and the protective layer were formed on the other surface was produced.

Attachment to Glass Substrate

First, a 3 mm-thick float glass sheet (available from Nippon Sheet Glass Co. Ltd.) was prepared as a glass substrate. Next, the release film of the pressure-sensitive adhesive layer of the infrared reflective film (transparent heat-shielding member) in which the pressure-sensitive adhesive layer was formed on one surface of the PET film base substrate, and the infrared reflective layer, the primer layer and the protective layer were formed on the other surface was removed, and the pressure-sensitive adhesive layer-side surface was attached to the float glass.

Comparative Example 3

A light diffusing pressure-sensitive adhesive layer-bearing infrared reflective film (transparent heat-shielding member) was produced in the same manner as in Example 1 except that the infrared reflective layer of Example 1 was replaced by an infrared reflective layer having a three-layer structure composed of a 35 nm thick indium tin oxide (ITO) layer, a 8 nm thick silver (Ag) layer and a 35 nm thick indium tin oxide (ITO) layer. Then, the produced infrared reflective film was attached to a glass substrate.

Comparative Example 4

A light diffusing pressure-sensitive adhesive layer-bearing infrared reflective film (transparent heat-shielding member) was produced in the same manner as in Example 1 except that the thickness of the silver (Ag) layer of the infrared reflective layer of Example 1 was changed to 21 nm. Then, the produced infrared reflective film was attached to a glass substrate.

Comparative Example 5

A light diffusing pressure-sensitive adhesive layer-bearing infrared reflective film (transparent heat-shielding member) was produced in the same manner as in Example 1 except that the amount of amorphous silicone resin fine particles TOSPEARL 240 (trade name, average particle size: 4.0 μm) added to form the light diffusing pressure-sensitive adhesive layer of Example 1 was changed to 0.12 parts (0.5 parts with respect to 100 parts of pressure-sensitive adhesive resin). Then, the produced infrared reflective film was attached to a glass substrate.

Comparative Example 6

A light diffusing pressure-sensitive adhesive layer-bearing infrared reflective film (transparent heat-shielding member) was produced in the same manner as in Example 1 except that the amount of amorphous silicone resin fine particles TOSPEARL 240 (trade name, average particle size: 4.0 μm) added to form the light diffusing pressure-sensitive adhesive layer of Example 1 was changed to 1.38 parts (5.5 parts with respect to 100 parts of pressure-sensitive adhesive resin). Then, the produced infrared reflective film was attached to a glass substrate.

Evaluation of Transparent Member

Each of the transparent members of Examples 1 to 14 and Comparative Examples 1 to 6 described above was cut and attached to a 5 cm square glass substrate to produce a measurement sample. Visible light transmittance, visible light reflectance, haze value, normal emissivity, shading coefficient, the initial adhesion of the protective layer, the adhesion after weather resistance test of the protective layer and scratch resistance were evaluated as follows by using the measurement sample. Also, each transparent member was cut and attached to a 30 cm×23 cm glass substrate to produce a measurement sample, and the background viewability and the viewability of an image projected by a projector were evaluated as follows by using the measurement sample.

Visible Light Transmittance

Visible light transmittance was obtained by measuring a spectral transmittance in a range of wavelengths from 380 to 780 nm by using a UV-Vis-NIR spectrophotometer Ubest V-570 type (trade name) available from JASCO Corporation, with the glass substrate side being set as the light-entering side, and performing calculation in accordance with JIS A5759-2008.

Visible Light Reflectance

Visible light reflectance was obtained by a measuring spectral reflectance in a range of wavelengths from 380 to 780 nm by using a UV-Vis-NIR spectrophotometer Ubest V-570 type (trade name) available from JASCO Corporation, with the protective layer side being set as the light-entering side, and performing calculation in accordance with JIS R3106-1998.

Haze Value

Haze value was obtained by performing measurement by using a haze meter NDH-2000 (trade name) available from Nippon Denshoku Industries Co., Ltd. with the protective layer side being set as the light-entering side, and then performing calculation in accordance with JIS K7136-2000.

Normal Emissivity

Normal emissivity was obtained by measuring a regular spectral reflectance in a range of wavelengths from 5 to 25.2 μm by using an infrared spectrophotometer IR Prestige 21 (trade name) available from Shimadzu Corporation to which an attachment for regular reflectance measurement had been attached, with the protective layer side surface being set as the light-entering side and performing calculation in accordance with JIS R3106-2008. In the calculation of the normal emissivity, a wavelength value of 25.2 μm was used as the regular spectral reflectance in a wavelength range of 25.2 to 50.0 μm.

Shading Coefficient

Shading coefficient was obtained by measuring a spectral transmittance and a spectral reflectance in a range of wavelengths from 300 to 2500 nm by using a UV-Vis-NIR spectrophotometer Ubest V-570 type (trade name) available from JASCO Corporation, with the glass substrate being set as the light-entering side, and performing calculation by using the values of solar transmittance and solar reflectance calculated in accordance with JIS A5759-2008 and the normal emissivity value obtained above.

Initial Adhesion of Protective Layer

The adhesion of the protective layer of a transparent member was evaluated by performing a grid tape separation test in accordance with JIS D0202-1988. To be specific, adhesion was evaluated by applying a cellophane tape CT24 (trade name) available from Nichiban Co., Ltd onto the protective layer so as to adhere to the protective layer by using the pad of the finger and thereafter peeling off the tape therefrom. Evaluation was made by the number of grid squares remaining without being taken away among 100 grid squares, and a rating of 100/100 was given if the protective layer was not taken away at all, and a rating of 0/100 was given if the protective layer was completely taken away.

Adhesion after Weather Resistance Test of Protective Layer

For the adhesion after weather resistance of the protective layer of a transparent member, a weather resistance test in accordance with JIS A5759-2008 was performed in which the protective layer of a transparent member was irradiated with a sunshine carbon arc lamp for 1000 hours, and thereafter the adhesion after weather resistance test of the protective layer was evaluated in the same manner as the initial adhesion described above.

Scratch Resistance of Protective Layer

For the scratch resistance of the protective layer of a transparent member, steel wool (#0000) available from Bonstar Sales Co., Ltd. was placed on the protective layer, and then moved back and forth 10 times under a load of 250 g/cm². After that, the surface condition of the protective layer was visually observed and evaluated based on the following three criteria:
A: no scratches were found;
B: a few (5 or less) scratches were found; and
C: a large number of scratches were found.

Background Viewability

Background viewability was obtained by, using a measurement sample attached to a 30 cm×23 cm glass substrate, evaluating, through visual observation, the ease of view of the background through the sample as viewed from the glass substrate side.

Viewability of Image Projected by Projector

For the viewability of an image projected by a projector, an image was actually projected, by using a portable laser pico projector SHOWWX+HDMI® Laser Pocket Projector (trade name) available from Micro Vision Co., Ltd., from the protective layer side of a measurement sample attached to a 30 cm×23 cm glass substrate. With respect to the reflected image from the projector side, luminance (brightness), the presence or absence of blur (image clarity) and the presence or absence of glittering were visually evaluated, and with respect to the transmitted image from the opposite side of the projector, luminance (brightness) and the presence or absence of blur (image clarity) were visually evaluated.

The luminance (brightness) was evaluated based on the following four criteria:
A: the image had a very high luminance, and viewability was very good;
B: the image had a high luminance, and viewability was good;
C: the image had a slightly low luminance, and viewability was slightly poor; and
D: the image was hardly viewed.

The presence or absence of blur (image clarity) was evaluated based on the following four criteria:
A: very good image clarity without blur in the image;
B: good image clarity with a slight amount of blur in the image;
C: slightly poor image clarity with a small amount of blur in the image; and
D: poor image clarity with a large amount of blur in the image.

The presence or absence of glittering was evaluated based on the following two criteria:
A: no glittering was observed; and
B: glittering was observed The above results are shown in Tables 1 to 4 together with the layer configuration of the transparent member attached to a glass substrate.

TABLE 1

|  |  | Ex. 1 | Ex. 2 | Ex. 3 | Ex. 4 | Ex. 5 | Ex. 6 |
|---|---|---|---|---|---|---|---|
| Layer Configuration | | Protective Layer Primer Layer Infrared Reflective Layer Transparent Base Substrate Light Diffusing Pressure-Sensitive Adhesive Layer Glass Substrate | Protective Layer Primer Layer Infrared Reflective Layer Transparent Base Substrate Light Diffusing Pressure-Sensitive Adhesive Layer Glass Substrate | Protective Layer Primer Layer Infrared Reflective Layer Transparent Base Substrate Light Diffusing Pressure-Sensitive Adhesive Layer Glass Substrate | Protective Layer Primer Layer Infrared Reflective Layer Transparent Base Substrate Light Diffusing Pressure-Sensitive Adhesive Layer Glass Substrate | Protective Layer Primer Layer Infrared Reflective Layer Transparent Base Substrate Light Diffusing Pressure-Sensitive Adhesive Layer Glass Substrate | Protective Layer Primer Layer Infrared Reflective Layer Transparent Base Substrate Light Diffusing Pressure-Sensitive Adhesive Layer Glass Substrate |
| Infrared Reflective Layer | | ITO: 29 nm Ag: 13 nm ITO: 29 nm | ITO: 29 nm Ag: 10 nm ITO: 29 nm | ITO: 29 nm Ag: 15 nm ITO: 29 nm | ALN: 30 nm Ag: 18 nm ALN: 30 nm | ITO: 29 nm Ag: 13 nm ITO: 29 nm | ITO: 29 nm Ag: 13 nm ITO: 29 nm |
| Light Diffusing Agent | Type of Resin Particles | Silicone | Silicone | Silicone | Silicone | Silicone | Silicone |
| | Average Particle Size (μm) | 4.0 | 4.0 | 4.0 | 4.0 | 4.0 | 4.0 |
| | Amount Added (part) | 3.5 | 3.5 | 3.5 | 3.5 | 1.0 | 4.5 |
| Protective Layer Thickness (μm) | | 1.4 | 1.4 | 1.4 | 1.4 | 1.4 | 1.4 |
| Visible Light Transmittance (%) | | 71.9 | 78.1 | 64.0 | 75.4 | 71.9 | 71.2 |
| Visible Light Reflectance (%) | | 19.6 | 13.4 | 25.6 | 18.6 | 19.7 | 19.6 |
| Haze Value (%) | | 23.5 | 23.5 | 23.8 | 23.1 | 8.2 | 30.5 |
| Shading Coefficient | | 0.56 | 0.65 | 0.50 | 0.53 | 0.56 | 0.56 |

TABLE 1-continued

|  |  | Ex. 1 | Ex. 2 | Ex. 3 | Ex. 4 | Ex. 5 | Ex. 6 |
|---|---|---|---|---|---|---|---|
| Normal Emissivity | | 0.23 | 0.26 | 0.20 | 0.22 | 0.23 | 0.23 |
| Initial Adhesion | | 100/100 | 100/100 | 100/100 | 100/100 | 100/100 | 100/100 |
| Adhesion after Weather Resistance Test | | 100/100 | 100/100 | 100/100 | 100/100 | 100/100 | 100/100 |
| Scratch Resistance | | A | A | A | A | A | A |
| Reflected Image | Luminance | A | B | A | A | B | A |
| | Blur | B | B | B | B | B | B |
| | Glittering | A | A | A | A | A | A |
| Transmitted Image | Luminance | A | A | B | A | B | A |
| | Blur | A | A | A | A | B | A |
| Background Viewability | | Very good | Very good | Good | Very good | Very good | Good |

TABLE 2

|  |  | Ex. 7 | Ex. 8 | Ex. 9 | Ex. 10 | Ex. 11 | Ex. 12 |
|---|---|---|---|---|---|---|---|
| Layer Configuration | | Protective Layer / Primer Layer / Infrared Reflective Layer / Transparent Base Substrate / Light Diffusing Pressure-Sensitive Adhesive Layer | Protective Layer / Primer Layer / Infrared Reflective Layer / Transparent Base Substrate / Light Diffusing Pressure-Sensitive Adhesive Layer | Protective Layer / Primer Layer / Infrared Reflective Layer / Transparent Base Substrate / Light Diffusing Pressure-Sensitive Adhesive Layer | Protective Layer / Transparent Base Substrate / Infrared Reflective Layer / Light Diffusing Pressure-Sensitive Adhesive Layer | Protective Layer / Primer Layer / Infrared Reflective Layer / Transparent Base Substrate / Light Diffusing Layer / Pressure-Sensitive Adhesive Layer | Protective Layer / Light Diffusing Layer / Infrared Reflective Layer / Transparent Base Substrate / Pressure-Sensitive Adhesive Layer |
| Infrared Reflective Layer | | Glass Substrate ITO: 29 nm Ag: 13 nm ITO: 29 nm | Glass Substrate ITO: 29 nm Ag: 13 nm ITO: 29 nm | Glass Substrate ITO: 29 nm Ag: 13 nm ITO: 29 nm | Glass Substrate ITO: 29 nm Ag: 13 nm ITO: 29 nm | Glass Substrate ITO: 29 nm Ag: 13 nm ITO: 29 nm | Glass Substrate ITO: 29 nm Ag: 13 nm ITO: 29 nm |
| Light Diffusing Agent | Type of Resin Particles | Silicone | Silicone | Silicone | Silicone | Silicone | Silicone |
| | Average Particle Size (μm) | 4.0 | 4.0 | 4.0 | 4.0 | 4.0 | 4.0 |
| | Amount Added (part) | 3.5 | 3.5 | 3.5 | 3.5 | 3.5 | 3.5 |
| Protective Layer Thickness (μm) | | 0.5 | 3.5 | 5.5 | 2.0 | 2.0 | 2.0 |
| Visible Light Transmittance (%) | | 72.1 | 71.7 | 71.6 | 71.9 | 72.0 | 71.8 |
| Visible Light Reflectance (%) | | 19.2 | 19.6 | 19.6 | 19.5 | 19.6 | 19.5 |
| Haze Value (%) | | 23.4 | 23.5 | 23.5 | 23.4 | 23.0 | 23.1 |
| Shading Coefficient | | 0.57 | 0.56 | 0.56 | 0.56 | 0.56 | 0.56 |
| Normal Emissivity | | 0.14 | 0.45 | 0.53 | 0.93 | 0.30 | 0.93 |
| Initial Adhesion | | 100/100 | 100/100 | 100/100 | 100/100 | 100/100 | 100/100 |
| Adhesion after Weather Resistance Test | | 100/100 | 100/100 | 100/100 | 100/100 | 100/100 | 100/100 |
| Scratch Resistance | | B | A | A | A | A | A |
| Reflected Image | Luminance | A | A | A | A | A | A |
| | Blur | B | B | B | B | B | A |
| | Glittering | A | A | A | A | A | A |
| Transmitted Image | Luminance | A | A | A | A | A | B |
| | Blur | A | A | A | A | A | A |
| Background Viewability | | Very good | Very good | Very good | Very good | Very good | Very good |

TABLE 3

|  | Ex. 13 | Ex. 14 | Comp. Ex. 1 | Comp. Ex. 2 | Comp. Ex. 3 | Comp. Ex. 4 |
|---|---|---|---|---|---|---|
| Layer Configuration | Protective Layer / Infrared Reflective Layer / Transparent Base Substrate / Light Diffusing Pressure-... | Protective Layer / Primer Layer / Infrared Reflective Layer / Transparent Base Substrate / Light Diffusing Pressure-... | Protective Layer / Transparent Base Substrate / Light Diffusing Pressure-... | Protective Layer / Primer Layer / Infrared Reflective Layer / Transparent Base Substrate / Pressure-Sensitive | Protective Layer / Primer Layer / Infrared Reflective Layer / Transparent Base Substrate / Light Diffusing Pressure-... | Protective Layer / Primer Layer / Infrared Reflective Layer / Transparent Base Substrate / Light Diffusing Pressure-... |

TABLE 3-continued

|  |  | Ex. 13 | Ex. 14 | Comp. Ex. 1 | Comp. Ex. 2 | Comp. Ex. 3 | Comp. Ex. 4 |
|---|---|---|---|---|---|---|---|
|  |  | Sensitive Adhesive Layer Glass Substrate | Sensitive Adhesive Layer Glass Substrate | Sensitive Adhesive Layer Glass Substrate | Adhesive Layer Glass Substrate | Sensitive Adhesive Layer Glass Substrate | Sensitive Adhesive Layer Glass Substrate |
| Infrared Reflective Layer |  | ITO: 29 nm Ag: 13 nm ITO: 29 nm | ITO: 29 nm Ag: 13 nm ITO: 29 nm | — | ITO: 29 nm Ag: 13 nm ITO: 29 nm | ITO: 35 nm Ag: 8 nm ITO: 35 nm | ITO: 29 nm Ag: 21 nm ITO: 29 nm |
| Light Diffusing Agent | Type of Resin Particles | Silicone | Silicone | Silicone | — | Silicone | Silicone |
|  | Average Particle Size (μm) | 4.0 | 4.0 | 4.0 | — | 4.0 | 4.0 |
|  | Amount Added (part) | 3.5 | 3.5 | 3.5 | — | 3.5 | 3.5 |
| Protective Layer Thickness (μm) |  | 2.0 | 1.4 | 1.4 | 1.4 | 1.4 | 1.4 |
| Visible Light Transmittance (%) |  | 71.3 | 71.7 | 88.9 | 72.5 | 79.8 | 55.9 |
| Visible Light Reflectance (%) |  | 19.8 | 19.5 | 9.9 | 19.7 | 10.2 | 32.3 |
| Haze Value (%) |  | 23.5 | 23.6 | 23.4 | 0.7 | 23.3 | 23.7 |
| Shading Coefficient |  | 0.57 | 0.57 | 0.89 | 0.57 | 0.73 | 0.45 |
| Normal Emissivity |  | 0.30 | 0.25 | 0.93 | 0.23 | 0.29 | 0.19 |
| Initial Adhesion |  | 100/100 | 100/100 | 100/100 | 100/100 | 100/100 | 100/100 |
| Adhesion after Weather Resistance Test |  | 20/100 | 100/100 | 100/100 | 100/100 | 100/100 | 100/100 |
| Scratch Resistance |  | A | B | A | A | A | A |
| Reflected Image | Luminance | A | A | C | D | C | A |
|  | Blur | B | B | C | Unable to perform evaluation | C | B |
|  | Glittering | A | A | A | Unable to perform evaluation | A | B |
| Transmitted Image | Luminance | A | A | A | D | A | C |
|  | Blur | A | A | A | Unable to perform evaluation | A | B |
| Background Viewability |  | Very good | Very good | Very good | Very good | Very good | Poor |

TABLE 4

|  |  | Comp. Ex. 5 | Comp. Ex. 6 |
|---|---|---|---|
| Layer Configuration |  | Protective Layer Primer Layer Infrared Reflective Layer Transparent Base Substrate Light Diffusing Pressure-Sensitive Adhesive Layer Glass Substrate | Protective Layer Primer Layer Infrared Reflective Layer Transparent Base Substrate Light Diffusing Pressure-Sensitive Adhesive Layer Glass Substrate |
| Infrared Reflective Layer |  | ITO: 29 nm Ag: 13 nm ITO: 29 nm | ITO: 29 nm Ag: 13 nm ITO: 29 nm |
| Light Diffusing Agent | Type of Resin Particles | Silicone | Silicone |
|  | Average Particle Size (μm) | 4.0 | 4.0 |
|  | Amount Added (part) | 0.5 | 5.5 |
| Protective Layer Thickness (μm) |  | 1.4 | 1.4 |
| Visible Light Transmittance (%) |  | 71.7 | 71.3 |
| Visible Light Reflectance (%) |  | 19.5 | 19.6 |
| Haze Value (%) |  | 3.9 | 36.1 |
| Shading Coefficient |  | 0.57 | 0.56 |
| Normal Emissivity |  | 0.23 | 0.23 |
| Initial Adhesion |  | 100/100 | 100/100 |
| Adhesion after Weather Resistance Test |  | 100/100 | 100/100 |
| Scratch Resistance |  | A | A |
| Reflected Image | Luminance | D | A |
|  | Blur | Unable to perform evaluation | B |
|  | Glittering | Unable to perform evaluation | A |
| Transmitted Image | Luminance | D | A |
|  | Blur | Unable to perform evaluation | A |
| Background Viewability |  | Very good | Slightly poor |

As shown in Tables 1 to 4, the transparent members of Examples 1 to 14 including an infrared reflective layer and a light diffusing layer had a visible light reflectance of 12% or more and 30% or less, a haze value of 5% or more and 35% or less and a shading coefficient of 0.69 or less, and thus it can be seen that they have sufficient performance as a heat-shielding film for saving energy that allows the background to be transparently viewed with clarity and also as a transparent screen for digital signage that allows a content image projected by a projector to be clearly viewed from both sides.

Also, it can be seen that the transparent member of Example 8 has a normal emissivity of 0.50 or less, and thus has heat shielding properties together with heat-insulating properties because a protective layer having a thickness of 3.5 μm, which is not greater than 5.0 μm, is provided on an infrared reflective layer via a primer layer having a thickness of 0.1 μm. Furthermore, it can also be seen that the transparent members of Examples 1 to 7, 11, 13 and 14 have a normal emissivity of 0.30 or less, and thus have heat shielding properties together with even higher heat-insulating performance because a protective layer having a thickness of 2.0 μm or less is provided directly on an infrared reflective layer, or via a primer layer having a thickness of 0.1 μm.

In Example 3, because the silver layer of the infrared reflective layer was as thick as 15 nm, the visible light transmittance was less than 65%, and the background viewability was slightly poor as compared with those of Examples 1 and 2. In Example 7, because the protective layer was as thin as 0.5 μm, the scratch resistance was slightly poor as compared with that of Example 1.

In Example 12, a light diffusing layer was formed on an infrared reflective layer (the light diffusing layer was formed on the side where a projector for projecting an image toward the infrared reflective layer was provided). Accordingly, the reflected image had a very high luminance and very good viewability, there was no blur in the image, and the image clarity was also very good. However, the light diffusing layer absorbed infrared rays, and thus the normal emissivity was high, and heat-insulating properties were not obtained. In Example 13, because a protective layer was provided directly on an infrared reflective layer without a primer layer interposed therebetween, the adhesion after weather resistance test was poor as compared with that of Example 1. In Example 14, a protective layer made of a silicone-based thermosetting resin was used, and thus the scratch resistance was slightly poor as compared with that of Example 1.

On the other hand, the transparent member of Comparative Example 1 had a light diffusing layer, but did not have an infrared reflective layer, and thus the shading coefficient was as high as 0.89, the high normal emissivity was as high as 0.93, and heat-shielding performance and heat-insulating performance were not obtained. Also, the reflected image had a slightly low luminance, and there was a small amount of blur in the image, and the viewability was slightly poor. The transparent member of Comparative Example 2 had an infrared reflective layer, but did not have a light diffusing layer, and thus it was almost not possible to view both the reflected image and the transmitted image. The transparent member of Comparative Example 3 had an infrared reflective layer and a light diffusing layer, but the visible light reflectance was less than 12%, and thus the reflected image had a slightly low luminance, there was a small amount of blur in the image, and the viewability was slightly poor.

The transparent member of Comparative Example 4 had an infrared reflective layer and a light diffusing layer, but the visible light reflectance was greater than 30%, and thus the image had a strong half-mirror appearance. Also, the reflected image was glittered, and the transmitted image had a slightly low luminance, and the viewability was slightly poor. In addition, the visible light transmittance was also low, and the background viewability was poor. The transparent member of Comparative Example 5 had an infrared reflective layer and a light diffusing layer, but the haze value was less than 5%, and thus it was almost not possible to view the reflected image and the transmitted image although they were barely recognized. The transparent member of Comparative Example 6 had an infrared reflective layer and a light diffusing layer, but the haze value was greater than 35%, and thus the transparent member appeared slightly whitish, and the background viewability was slightly poor.

When the transparent heat-shielding member according to the present invention is used by being attached to a transparent substrate such as, for example, a window pane by using a transparent pressure-sensitive adhesive or the like, the transparent heat-shielding member according to the present invention can be used as a solar control transparent film for saving energy that allows the background to be transparently viewed with clarity and has heat shielding properties or heat-shielding/heat-insulating properties, and at the same time, it can be used as a transparent screen for digital signage that allows content images projected by a projector to be clearly viewed from both sides. Accordingly, the transparent heat-shielding member according to the present invention is very useful in a wide variety of situations.

The present invention may be embodied in other forms without departing from the spirit or essential characteristics thereof. The embodiments disclosed in this application are to be considered in all respects as illustrative and not limiting. The scope of the present invention is indicated by the appended claims rather than by the foregoing description, and all changes which come within the meaning and range of equivalency of the claims are intended to be embraced therein.

What is claimed is:

1. A transparent heat-shielding member comprising a transparent base substrate, an infrared reflective layer and a transparent screen function layer,
    wherein the infrared reflective layer includes at least one selected from a metal oxide layer and a metal nitride layer, and a metal layer,
    the transparent screen function layer is formed of a light diffusing layer,
    the light diffusing layer contains light diffusing particles and a transparent resin,
    the light diffusing particles are dispersed in the transparent resin, and
    the transparent heat-shielding member has a visible light reflectance measured in accordance with JIS R3106-1998 of 12% or more and 30% or less, a haze value measured in accordance with JIS K7136-2000 of 5% or more and 35% or less, and a shading coefficient measured in accordance with JIS A5759-2008 of 0.69 or less.

2. The transparent heat-shielding member according to claim 1,
    wherein the transparent screen function layer enables an image projected onto a screen by a projector to be viewed from both sides as a reflected image from the projector side and as a transmitted image from an opposite side of the projector across the screen.

3. The transparent heat-shielding member according to claim 1,
    wherein the transparent heat-shielding member has a visible light transmittance measured in accordance with JIS A5759-2008 of 65% or more.

4. The transparent heat-shielding member according to claim 1, further comprising a protective layer as an outermost layer, wherein the protective layer contains a resin selected from an ionizing radiation curable resin and a thermally curable resin.

5. The transparent heat-shielding member according to claim 1, further comprising a protective layer as an outermost layer,
   wherein the protective layer contain a resin selected from an ionizing radiation curable resin and a thermally curable resin,
   the protective layer and the infrared reflective layer are joined via a primer layer, and
   the primer layer is made of a modified polyolefin resin.

6. The transparent heat-shielding member according to claim 1,
   wherein the transparent heat-shielding member has a normal emissivity measured in accordance with JIS R3106-2008 of 0.50 or less.

7. The transparent heat-shielding member according to claim 1,
   wherein the transparent heat-shielding member has a normal emissivity measured in accordance with JIS R3106-2008 of 0.30 or less.

8. The transparent heat-shielding member according to claim 1, further comprising a pressure-sensitive adhesive layer as an outermost layer.

9. The transparent heat-shielding member according to claim 1,
   wherein the light diffusing layer is disposed as an outermost layer, and
   the transparent resin contained in the light diffusing layer is a pressure-sensitive adhesive.

\* \* \* \* \*